(12) United States Patent
Harrison et al.

(10) Patent No.: US 10,484,973 B2
(45) Date of Patent: Nov. 19, 2019

(54) SEMI-PERSISTENT CSI FEEDBACK OVER PUSCH

(71) Applicant: Telefonaktiebolaget LM Ericsson (publ), Stockholm (SE)

(72) Inventors: Robert Mark Harrison, Grapevine, TX (US); Shiwei Gao, Nepean (CA); Mattias Frenne, Uppsala (SE); Siva Muruganathan, Stittsville (CA); Sebastian Faxér, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/229,800

(22) Filed: Dec. 21, 2018

(65) Prior Publication Data

US 2019/0141677 A1 May 9, 2019

Related U.S. Application Data

(63) Continuation of application No. PCT/IB2018/052002, filed on Mar. 23, 2018.
(Continued)

(51) Int. Cl.
*H04W 72/04* (2009.01)
*H04W 24/10* (2009.01)

(52) U.S. Cl.
CPC ........... *H04W 72/04* (2013.01); *H04W 24/10* (2013.01)

(58) Field of Classification Search
None
See application file for complete search history.

(56) References Cited

U.S. PATENT DOCUMENTS

2011/0249578 A1* 10/2011 Nayeb Nazar ........ H04L 1/0027
370/252
2015/0043458 A1 2/2015 Seo et al.
(Continued)

FOREIGN PATENT DOCUMENTS

WO 2011/085230 A2 7/2011
WO 2018/044116 A1 3/2018

OTHER PUBLICATIONS

International Search Report and Written Opinion dated Jun. 15, 2018 issued in the corresponding PCT Application No. PCT/IB2018/052002, consisting of 14 pages.
(Continued)

*Primary Examiner* — Otis L Thompson, Jr.
(74) *Attorney, Agent, or Firm* — Christopher & Weisberg, P.A.

(57) ABSTRACT

A user equipment, base station and method for transmitting semi-persistent channel state information (SP-CSI) on a physical uplink shared channel (PUSCH) are provided. The user equipment includes processing circuitry configured to receive a control signaling message the control signaling message configuring the user equipment with at least one SP CSI report configuration on the PUSCH, and the message identifying a SP CSI reporting periodicity. The user equipment also receives physical layer control signaling identifying and activating the at least one SP CSI report configuration. Transmitter circuitry is configured to transmit a plurality of SP CSI reports, the reports being transmitted with the periodicity and according to the physical layer control signaling and the control signaling message.

19 Claims, 20 Drawing Sheets

Related U.S. Application Data

(60) Provisional application No. 62/476,483, filed on Mar. 24, 2017.

(56) References Cited

U.S. PATENT DOCUMENTS

| | | | | |
|---|---|---|---|---|
| 2018/0175993 | A1* | 6/2018 | Onggosanusi | H04L 5/0057 |
| 2018/0219606 | A1* | 8/2018 | Ng | H04B 7/0617 |
| 2018/0227031 | A1* | 8/2018 | Guo | H04B 7/0626 |
| 2018/0227035 | A1* | 8/2018 | Cheng | H04B 7/088 |
| 2018/0269939 | A1* | 9/2018 | Hu | H04B 7/0452 |
| 2019/0037586 | A1* | 1/2019 | Park | H04W 72/1284 |
| 2019/0058517 | A1* | 2/2019 | Kang | H04B 7/06 |
| 2019/0068268 | A1* | 2/2019 | Zhang | H04B 7/0626 |

OTHER PUBLICATIONS

3GPP TR 38.802 V1.2.0 (Feb. 2017); 3rd Generation Partnership Project; Technical Specification Group Radio Access Network; Study on New Radio (NR) Access Technology; Physical Layer Aspects (Release 14), consisting of 84 pages.
3GPP TS 36.211 V14.1.0 (Dec. 2016); 3rd Generation Partnership Project; Technical Specification Group Radio Access Network; Evolved Universal Terrestrial Radio Access (E-UTRA); Physical Channels and Modulation (Release 14), consisting of 175 pages.
3GPP TS 36.212 V14.1.0 (Dec. 2016); 3rd Generation Partnership Project; Technical Specification Group Radio Access Network; Evolved Universal Terrestrial Radio Access (E-UTRA); Multiplexing and Channel Coding (Release 14), consisting of 177 pages.
3GPP TS 36.213 V14.1.0 (Feb. 2016); 3rd Generation Partnership Project; Technical Specification Group Radio Access Network; Evolved Universal Terrestrial Radio Access (E-UTRA); Physical Layer Procedures (Release 14), consisting of 414 pages.
3GPP TSG RAN WG1 #88 Meeting, R1-1701681, Feb. 13-17, 2017, Athens, Greece; Agenda Item: 8.1.2.3.1; Huawei, HiSilicon Independent and Joint Control of CSI_RS Transmission and CSI Reporting for NR MIMO; Document for Discussion and Decision, consisting of 8 pages.
3GPP TSG RAN WG1 #88 Meeting, R1-1702609, Feb. 13-17, 2017, Athens, Greece; Agenda Item: 8.1.2.3.1; Qualcomm Incorporated; "Details of CSI Framework"; Document for Discussion and Decision, consisting of 6 pages.
3GPP TSG RAN WG1 #88 Meeting, R1-1702944, Feb. 13-17, 2017, Athens, Greece; Agenda Item: 8.1.2.3.5; Samsung; "Discussions on Periodic and Semi-Persistent CSI Reporting for NR"; Document for Discussion and Decision, consisting of 6 pages.
3GPP TS 36.321 V14.1.0 (Dec. 2016) 3rd Generation Partnership Project; Technical Specification Group Radio Access Network; Evolved Universal Terrestrial Radio Access (E-UTRA); Medium Access Control (MAC) Protocol Specification (Release 14), consisting of 98 pages.
Notification of Transmittal of the International Preliminary Report on Patentability dated Jun. 4, 2019 issued in PCT Application No. PCT/IB2018/052002, consisting of 28 pages.
Written Opinion of the International Preliminary Examining Authority dated Mar. 6, 2019 issued in the corresponding PCT Application No. PCT/IB2018/052002, consisting of 8 pages.

* cited by examiner

US 10,484,973 B2

SEMI-PERSISTENT CSI FEEDBACK OVER PUSCH

CROSS REFERENCE TO RELATED APPLICATIONS

The present application is a continuation of International Application No. PCT/IB2018/052002, filed Mar. 23, 2018, entitled "SEMI-PERSISTENT CSI FEEDBACK OVER PUSCH" which claims priority to and the benefit of the filing date of U.S. Provisional Patent Application Ser. No. 62/476,483, filed Mar. 24, 2017, all of which are incorporated herein by reference in their entireties.

FIELD

The disclosure relates to wireless communications, and in particular, to semi-persistent Channel State Information (CSI) feedback over Physical Uplink Shared Channel (PUSCH).

BACKGROUND

The next generation mobile wireless communication system (5G) or new radio (NR), will support a diverse set of use cases and a diverse set of deployment scenarios. The latter includes deployment at both low frequencies (100s of MHz), similar to LTE today, and very high frequencies (mm waves in the tens of GHz).

Similar to Long Term Evolution (LTE), NR uses Orthogonal Frequency Division Multiplexing (OFDM) in the downlink (i.e., from a network node such as a gNodeB (gNB), eNB, or base station, to a wireless device such as a user equipment or UE) and uplink (i.e. from wireless device to network node). In the uplink both discrete Fourier transform (DFT)-spread OFDM (DFT-S-OFDM) and OFDM are supported.

The basic NR physical resource can thus be seen as a time-frequency grid similar to the one in LTE as illustrated in FIG. 1, where each resource element corresponds to one OFDM subcarrier during one OFDM symbol interval. FIG. 1 is a diagram of LTE physical resources. Although a subcarrier spacing of $\Delta f=15$ kHz is shown in FIG. 1, different subcarrier spacing values are supported in NR. The supported subcarrier spacing values (also referred to as different numerologies) in NR are given by $\Delta f=(15\times 2^{\alpha})$ kHz where $\alpha$ is a non-negative integer.

Furthermore, the resource allocation in LTE is typically described in terms of resource blocks (RBs), where a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency. A RB is also referred to as physical RB (PRB) in the rest of sections.

In the time domain, downlink and uplink transmissions in NR will be organized into equally-sized subframes similar to LTE as shown in FIG. 2. FIG. 2 is a diagram of an LTE time-domain structure with 15 kHz subcarrier spacing. In NR, the subframe length is also 1 ms regardless of numerology configured. A subframe is further divided into slots. For 15 kHz subcarrier spacing, there is one 14-symbol slot, or two 7-symbol slots per subframe. For subcarrier spacing of greater than 15 kHz, there are more slots per subframe.

Downlink transmissions in LTE and NR are dynamically scheduled, i.e., in each subframe or slot, the network node transmits downlink control information (DCI) about which wireless device data is to be transmitted to and which resource blocks in the current downlink subframe the data is transmitted on. This control signaling is typically transmitted in the first few OFDM symbols in each subframe in LTE and each slot in NR. The control information is carried on the Physical Downlink Control Channel (PDCCH) and data is carried on the Physical Downlink Shared Channel (PDSCH). A wireless device first detects and decodes the PDCCH and if a PDCCH is decoded successfully, it then decodes the corresponding PDSCH based on the decoded control information in the PDCCH. Each wireless device is assigned with a C-RNTI (Cell Radio Network Temporary Identifier), which is unique within the serving cell. The C-RNTI is used to scramble the CRC (cyclic redundancy check) bits of the PDCCH intended for the wireless device. A wireless device recognizes its PDCCH by checking the C-RNTI used to scramble the CRC (cyclic redundancy check) bits of the PDCCH.

Uplink data transmission are also dynamically scheduled using the PDCCH. Similar to downlink, a wireless device first decodes uplink grants in the PDCCH and then transmits data over the Physical Uplink Shared Channel (PUSCH) based on the decoded control information in the uplink grant such as modulation order, coding rate, uplink resource allocation, etc.

In LTE, semi-persistent scheduling (SPS) is also supported in both uplink and downlink, in which periodic data transmissions are activated or deactivated by the PDCCH. After the first SPS activation, there is no PDCCH transmitted for the subsequent data transmissions. The CRC bits of the PDCCH used for SPS activation or deactivation are scrambled by SPS-C-RNTI, which is configured for a wireless device if the wireless device supports SPS.

In addition to the PUSCH, the Physical Uplink Control Channel (PUCCH) is also supported in NR to carry uplink control information (UCI) such as HARQ (Hybrid Automatic Repeat Request) related Acknowledgement (ACK), Negative Acknowledgement (NACK), or Channel State Information (CSI) feedback.

Although many details of NR PUCCH are still to be determined, it is envisioned that, similar to LTE, PUCCH resources will be pre-allocated in a cell and shared by all wireless devices.

PUCCH in LTE

LTE uses hybrid-ARQ, where, after receiving downlink data in a subframe, the terminal attempts to decode it and reports to the base station whether the decoding was successful (ACK) or not (NAK). In case of an unsuccessful decoding attempt, the network node can retransmit the erroneous data.

Uplink control information (UCI) transmitted from the wireless device to the network node consists of:
  HARQ-ACK/NACK for received downlink data;
  Downlink CSI; and
  Scheduling requests (SRs), indicating that a mobile terminal needs uplink resources for uplink data transmissions.

This UCI information is carried on the Physical Uplink Control Channel (PUCCH). In order to provide frequency diversity, frequency resources for the PUCCH are switched on the slot boundary, i.e., one RB consists of 12 subcarriers at the upper part of the spectrum in the first slot of a subframe and another RB at the lower part of the spectrum during the second slot of the subframe or vice versa. This is often referred to as PUCCH frequency hopping. An example is shown in FIG. 3. FIG. 3 is a diagram of an Uplink L1/L2 control signaling transmission on the PUCCH. If more resources are needed for the uplink control signaling, e.g., in case of very large overall transmission bandwidth supporting a large number of users, additional resources blocks can be assigned next to the previously assigned resource blocks.

PUCCH Formats

There are 5 PUCCH formats defined in LTE, i.e., PUCCH format 1 to format 5, each capable of carrying a different number of UCI bits. The following is a list of combinations of UCI on different PUCCH formats in LTE:

Format 1 for positive scheduling requests (SR).
Format 1a for 1-bit HARQ-ACK or for 1-bit HARQ-ACK with positive SR.
Format 1b for 2-bit HARQ-ACK or for 2-bit HARQ-ACK with positive SR.
Format 2 for a CSI report when not multiplexed with HARQ-ACK.
Format 2a for a CSI report multiplexed with 1-bit HARQ-ACK for normal cyclic prefix.
Format 2b for a CSI report multiplexed with 2-bit HARQ-ACK for normal cyclic prefix.
Format 2 for a CSI report multiplexed with HARQ-ACK for extended cyclic prefix.
Format 3 for up to 10-bit HARQ-ACK for FDD and for up to 20-bit HARQ-ACK for TDD.
Format 3 for up to 11-bit corresponding to 10-bit HARQ-ACK and 1-bit positive/negative SR for FDD and for up to 21-bit corresponding to 20-bit HARQ-ACK and 1-bit positive/negative SR for TDD.
Format 3 for HARQ-ACK, 1-bit positive/negative SR (if any) and CSI report(s).
Format 4 for more than 22 bits of UCI including HARQ-ACK, SR (if any) and periodic CSI report(s) (if any).
Format 5 for more than 22 bits of UCI including HARQ-ACK, SR (if any) and periodic CSI report(s) (if any).
Format 4 for more than one CSI report and SR (if any).
Format 5 for more than one CSI report and SR (if any).

PUCCH format 1 is used for carrying SR only, while PUCCH format 1a/1b are used to carry one or two bits ACK/NACK information, respectively, or one or two bits ACK/NACK with SR.

A CSI report consists of multiple bits per subframe. Transmission of CSI reports on the PUCCH is handled by PUCCH formats 2, 3, 4, and 5, which are capable of multiple information bits per subframe.

PUCCH format 2 can carry a payload of at most 11 bits. Variants of format 2 are format 2a and 2b which also carries HARQ-ACK information of 1 and 2 bits, respectively, for normal cyclic prefix. For extended cyclic prefix, PUCCH Format 2 can also carry HARQ-ACK information. For simplicity, they are all referred to as format 2 herein.

PUCCH format 3 is designed to support larger HARQ-ACK payloads to support carrier aggregation (CA) with up to 5 component carriers (CCs), and can carry up to 10 or 20 HARQ-ACK bits for FDD and TDD, respectively. PUCCH format 3 can also carry SR, and support up to 21 bits total. PUCCH format 3 can also carry CSI.

Information bits or symbols for PUCCH formats 1-3 are code division multiplexed on to a RB. Different wireless devices can be semi-statically configured with particular PUCCH formats 1-3 resources and multiple wireless devices can be supported in the same RB.

PUCCH formats 4 and 5 carry still larger payloads, mainly used for carrier aggregation (CA) with up to 32 component carriers (CCs). PUCCH format 4 can be configured with up to 8 RBs. PUCCH format 5 occupies one RB and UCI for two WDs can be multiplexed in the same RB.

PUCCH uses either BPSK or QPSK modulation. Table 1 is a summary of the supported PUCCH formats in LTE.

TABLE 1

Supported PUCCH formats in LTE

| PUCCH format | Modulation scheme | Number of coded bits per subframe | Number of UCI bits per subframe |
|---|---|---|---|
| 1 | N/A | N/A | N/A |
| 1a | BPSK | 1 | 1 |
| 1b | QPSK | 2 | 2 |
| 2 | QPSK | 20 | Up to 11 |
| 2a | QPSK + BPSK | 21 | Up to 11 |
| 2b | QPSK + QPSK | 22 | Up to 11 |
| 3 | QPSK | 48 | Up to 10 for FDD and 20 for TDD |
| 4 | QPSK | Up to 288 per PRB | >22 |
| 5 | QPSK | Up to 144 per PRB | >22 |

Transmission Schemes

In LTE, multiple transmission schemes are supported including:

Single antenna port scheme;
Transmit diversity scheme;
Large delay CDD (Cyclic Delay Diversity) scheme;
Close-loop spatial multiplexing scheme;
Multi-user MIMO (Multiple Input and Multiple Output) scheme;
Dual layer scheme; and
Up to 8 layer transmission scheme.

In addition, there are ten transmission modes (TMs), i.e., Mode 1 to Mode 10. Each Transmission mode is associated with a transmission scheme. A wireless device is semi-statically configured with one transmission mode. For each transmission mode, the CSI contents are generally different. For example, TM3 is associated with a large delay CDD scheme, generally referred to as open-loop transmission mode. In TM3, a precoder matrix indication (PMI) is not reported in CSI and only one channel quality indication (CQI) is reported regardless of rank 1 or rank 2. TM4 is associated with a closed-loop spatial multiplexing scheme, generally referred to as closed-loop transmission mode. The CSI report includes PMI, rank indication (RI) and CQI. TM9 is associated with the "up to 8 layer transmission scheme" and the CSI report in this TM includes RI, PMI and CQI. However, in LTE Third Generation Partnership Project (3GPP) Release-14 (referred to as Rel-14), semi-open-loop transmission and an advanced CSI codebook were introduced to TMs 9 and 10 and the CSI contents are different in each case. For semi-open-loop, either no PMI or partial PMI is fed back depending on the number of antennas and codebooks used. For advanced codebook based CSI, higher resolution CSI is fed back from wireless device to base station and there are more CSI bits to feedback. TM10 is also associated with the "up to 8 layer transmission scheme" but can support CSI feedback for more than one serving transmission point or cell, so it is often referred as the CoMP (Coordinated Multiple Transmission Point) mode. In general, the CSI contents and payload size are different for different TMs.

LTE supports carrier aggregation of up to 32 component carriers (CCs) in the downlink. Each CC acts as a cell and one of them is a primary cell or carrier. Only the primary carrier may have an associated uplink carrier. In this case, ACK/NACK, SR, and CSI for each downlink component carrier are aggregated and transmitted on the single uplink carrier. The aggregated UCI payload size thus can be quite large.

To simplify the transmission schemes, NR will support only two transmission schemes, i.e.:

Scheme 1: Closed loop transmission

Scheme 2: Open loop and semi-open loop transmission

Dynamic switching between transmission schemes may be supported. Carrier aggregation may also be supported in NR.

CSI-RS Transmission

Similar to LTE, in NR a unique reference signal is transmitted from each antenna port at the network node for downlink channel estimation at a wireless device. Reference signals for downlink channel state estimation measurements are commonly referred to as channel state information reference signal (CSI-RS). For N antenna ports, N CSI-RS signals are required, each associated with one antenna port.

By measuring on CSI-RS, a wireless device can estimate the effective channel the CSI-RS is traversing including the radio propagation channel and antenna gains at both the network node and the wireless device. Mathematically, this implies that if a known CSI-RS signal $x_i$ (i=1, 2, ..., $N_{tx}$) is transmitted on the ith transmit antenna port at network node, the received signal $y_j$ (j=1, 2, ..., $N_{rx}$) on the jth receive antenna port of a wireless device can be expressed as $$y_j = h_{i,j} x_i + n_j$$

where $h_{i,j}$ is the effective channel between the ith transmit antenna port and the jth receive antenna port, $n_j$ is the receiver noise associated with the jth receive antenna port, $N_{tx}$ is the number of transmit antenna ports at the network node and $N_{rx}$ is the number of receive antenna ports at the wireless device.

A wireless device can estimate the $N_{rx} \times N_{tx}$ effective channel matrix H (H(i,j)=$h_{i,j}$) and thus the channel rank, precoding matrix, and channel quality. This is achieved by using a predesigned codebook for each rank, with each codeword in the codebook being a precoding matrix candidate. A wireless device searches through the codebook to find a rank, a codeword associated with the rank, and channel quality associated with the rank and precoding matrix to best match the effective channel and the noise. The rank, the precoding matrix and the channel quality are reported in the form of a rank indicator (RI), a precoding matrix indicator (PMI) and a channel quality indicator (CQI) as part of CSI feedback. This results in so-called channel dependent precoding, or closed-loop precoding. Such precoding essentially strives to focus the transmit energy into a subspace which is strong in the sense of conveying much of the transmitted energy to the wireless device.

A CSI-RS signal is transmitted on a set of time-frequency resource elements (REs) associated with an antenna port. For channel estimation over the whole system bandwidth, CSI-RS is typically transmitted over the whole system bandwidth. The set of REs used for CSI-RS transmission in a subframe is referred to as a CSI-RS resource. From a wireless device perspective, an antenna port is equivalent to a CSI-RS that the wireless device shall use to measure the channel. Up to 32 (i.e. $N_{tx}$=32) antenna ports are supported in NR and thus 32 CSI-RS signals can be configured for a wireless device.

In NR, the following three types of CSI-RS transmissions are supported:

Periodic CSI-RS Transmission: CSI-RS is transmitted periodically in certain subframes. This CSI-RS transmission is semi-statically configured using parameters such as CSI-RS resource, periodicity and subframe offset similar to LTE.

Aperiodic CSI-RS Transmission: This is a "one-shot" CSI-RS transmission that can happen in any subframe. One-shot signifies that CSI-RS transmission only happens once per trigger. The CSI-RS resources (i.e., the resource element locations which consist of subcarrier locations and OFDM symbol locations) for aperiodic CSI-RS are semi-statically configured. The transmission of aperiodic CSI-RS is triggered by dynamic signaling through the PDCCH. The triggering may also include selecting a CSI-RS resource from multiple CSI-RS resources.

Semi-Persistent CSI-RS Transmission: Similar to periodic CSI-RS, resources for semi-persistent CSI-RS transmissions are semi-statically configured with parameters such as periodicity and subframe offset. However, unlike periodic CSI-RS, dynamic signaling is needed to activate and possibly deactivate the CSI-RS transmissions. An example is shown in FIG. 4. In particular, FIG. 4 shows the timing of semi-persistent CSI-RS transmission.

In NR, two types of CSI feedback may be supported for closed-loop transmission, i.e., Type I and Type II.

Type I is codebook based PMI feedback with normal resolution targeting single-user MIMO (SU-MIMO) transmissions Type II is an enhanced CSI feedback with higher resolution targeting multi-user MIMO (MU-MIMO) transmissions Two different codebooks will be designed for the two feedback types. With Type II feedback, there are more bits for PMI feedback than in Type I.

CSI Reporting:

In LTE, wireless devices can be configured to report CSI in periodic or aperiodic reporting modes. Periodic CSI reporting is carried on the PUCCH while aperiodic CSI is carried on the PUSCH. The PUCCH is transmitted on one or more preconfigured numbers of physical resource blocks (PRBs) and uses a single spatial layer with quadrature phase shift keying (QPSK) modulation. PUSCH resources carrying aperiodic CSI reporting are dynamically allocated through uplink grants carried over the PDCCH or the enhanced PDCCH (EPDCCH), and can occupy a variable number of PRBs, use modulation states such as QPSK, 16 quadrature amplitude modulation (QAM), and 64 QAM, as well as multiple spatial layers. So the PUSCH is more flexible in terms of resource allocation in adapting to UCI payload size and also modulation/coding rate in adapting to the channel conditions.

In LTE, a periodic CSI report can occur in the same subframes as those containing SPS PUSCH, in which case the periodic CSI reports are piggy backed on the PUSCH. This allows periodic CSI to be transmitted using link adaptation, and so periodic CSI can be transmitted in a more spectrally efficient manner than on the PUCCH (which always uses QPSK with a fixed number of resources). However, periodic CSI reports are formed such that they fit in the preconfigured small payload of the PUCCH, and so may carry less information even when they are piggy backed on the PUSCH, for example by the use of codebook subsampling. By contrast, aperiodic CSI reporting on the PUSCH uses the full resolution of the CSI feedback, and is not subsampled. Furthermore, periodic CSI reporting in LTE requires that at least one PUCCH resource be configured for the wireless device, which is a waste of PUCCH resources which are reserved and may be unused even if the periodic CSI is always carried on PUSCH. Therefore, while LTE can transmit periodic CSI on PUSCH with semi-persistent resource allocation, such CSI is generally less accurate than aperiodic CSI on PUSCH In LTE, the PDCCH uplink (UL) grant allocates a single resource for all content to be carried on the PUSCH, including UL-SCH (UL Shared Channel, carried on PUSCH), CSI (including RI, CRI (CSI-RS resource indicator), relative power indicator (RPI), CQI, and PMI), and HARQ-ACK. (Because the size of the message is determined according to the reported RI, CRI, and/or RPI when CSI is piggy backed on the PUSCH, the network node does not know at the time of the UL grant what the size of the UL CSI will be. The network node must therefore allocate extra resources to ensure that both the CSI and the other content will fit on the PUSCH resource. It should also be noted that CSI on the PUSCH always carries complete CSI messages for each cell, CSI process, and/or eMIMO-Type: all configured parameters (i.e., one or more of RI, CRI, RPI, CQI, PMI) to be reported for the cell, CSI process, and/or eMIMO-type are reported together in one transmission on the PUSCH.

The wireless device is generally required to update each new CSI report whether it is reported periodically or aperiodically. However, if the number of CSI reports to be produced is greater than the number of CSI processes, the wireless device is not required to update the CSI report in order to limit the wireless device computation complexity. This does not however signify that the wireless device is forbidden from updating the report, and so whether a CSI report will be identical to a prior transmitted report in this case is not known.

In NR, in addition to periodic and aperiodic CSI reporting as in LTE, semi-persistent CSI reporting will also be supported. Thus, three types of CSI reporting will be supported in NR as follows:

Periodic CSI Reporting: CSI is reported periodically by the wireless device. Parameters such as periodicity and subframe offset are configured semi-statically using higher layer signaling from the network node to the wireless device.

Aperiodic CSI Reporting: This type of CSI reporting involves a single-shot (i.e., one time) CSI report by the wireless device which is dynamically triggered by the network node, e.g. by the DCI in the PDCCH. Some of the parameters related to the configuration of the aperiodic CSI report is semi-statically configured from the network node to the wireless device but the triggering is dynamic.

Semi-Persistent CSI Reporting: similar to periodic CSI reporting, semi-persistent CSI reporting has a periodicity and subframe offset which may be semi-statically configured by the network node to the wireless device. However, a dynamic trigger from the network node to wireless device may be needed to allow the wireless device to begin semi-persistent CSI reporting. In some cases, a dynamic trigger from network node to wireless device may be needed to command the wireless device to stop the semi-persistent transmission of CSI reports.

With regard to CSI-RS transmission and CSI reporting, the following combinations will be supported in NR:

For periodic CSI-RS transmission
  Semi-persistent CSI reporting is dynamically activated/deactivated;
  Aperiodic CSI reporting is triggered by DCI.

For semi-persistent transmission of CSI-RS,
  Semi-persistent CSI reporting is activated/deactivated dynamically;
  Aperiodic CSI reporting is triggered by DCI.

For aperiodic transmission of CSI-RS,
  Aperiodic CSI reporting is triggered by DCI;
  Aperiodic CSI-RS is triggered dynamically.

CSI Frame Work in NR:

In NR, a wireless device can be configured with $N \geq 1$ CSI reporting settings, $M \geq 1$ Resource settings, and one CSI measurement setting, where the CSI measurement setting includes $L \geq 1$ links and the value of L may depend on the wireless device capability. At least the following configuration parameters are signaled via RRC at least for CSI acquisition.

N, M, and L are indicated either implicitly or explicitly.
In each CSI reporting setting, at least: reported CSI parameter(s), CSI Type (I or II) if reported, codebook configuration including codebook subset restriction, time-domain behavior, frequency granularity for CQI and PMI, measurement restriction configurations.

In each Resource setting:
  A configuration of $S \geq 1$ CSI-RS resource set(s);
  A configuration of $K_s \geq 1$ CSI-RS resources for each set s, including at least: mapping to REs, the number of ports, time-domain behavior, etc.;
  Time domain behavior: aperiodic, periodic or semi-persistent;
  RS type which encompasses at least CSI-RS.

In each of the L links in CSI measurement setting: CSI reporting setting indication, Resource setting indication, quantity to be measured (either channel or interference)
  One CSI reporting setting can be linked with one or multiple Resource settings;
  Multiple CSI reporting settings can be linked.

At least, the following are dynamically selected by L1 or L2 signaling, if applicable.
  One or multiple CSI reporting settings within the CSI measurement setting;
  One or multiple CSI-RS resource sets selected from at least one Resource setting;
  One or multiple CSI-RS resources selected from at least one CSI-RS resource set.

Control Signaling

LTE control signaling can be carried in a variety of ways, including carrying control information on the PDCCH or the PUCCH, embedded in the PUSCH, in medium access control (MAC) control elements ("MAC CEs"), or in radio resource control (RRC) signaling. Each of these mechanisms is customized to carry a particular kind of control information.

Control information carried on the PDCCH, the PUCCH, or embedded in ('piggy backed on') the PUSCH is physical layer related control information, such as downlink control information (DCI), uplink control information (UCI), as described in 3GPP Technical Specification (TS) 36.211, 36.212, and 36.213. DCI is generally used to instruct the wireless device to perform some physical layer function, providing the needed information to perform the function. UCI generally provides the network with needed information, such as HARQ-ACK, scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded. MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in LTE up to Rel-14.

2D Antenna Arrays

Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N=N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port. An example of a 4×4 array with cross-polarized antenna elements is illustrated in FIG. 5. In particular, FIG. 5 is a block diagram of a two-dimensional (m×1) antenna array of cross-polarized antenna elements ($N_p$=2), with $N_h$=4 horizontal antenna elements and $N_v$=4 vertical antenna elements.

Precoding may be interpreted as multiplying the signal with different beamforming weights for each antenna prior to transmission. A typical approach is to tailor the precoder to the antenna form factor, i.e., taking into account $N_h$, $N_v$ and $N_p$ when designing the precoder codebook. Such 2D codebooks may not strictly relate vertical or horizontal dimensions to the dimensions that antenna ports are associated with. Therefore, 2D codebooks can be considered to have a first and a second number of antenna ports $N_1$ and $N_2$, wherein $N_1$ can correspond to either the horizontal or vertical dimension, and so $N_2$ corresponds to the remaining dimension. That is, if $N_1=N_h$, then $N_2=N_v$, while if $N_1=N_v$, then $N_2=N_h$. Similarly, 2D codebooks may not strictly related antenna ports to polarization, and be designed with cophasing mechanisms used to two combine beams or two antenna ports, as described in the following section.

DFT-Based Precoders

A common type of precoding is to use a DFT-precoder, where the precoder vector used to precode a single-layer transmission using a single-polarized uniform linear array (ULA) with $N_1$ antennas is defined as $$w_{1D}(l, N_1, O_1) = \frac{1}{\sqrt{N_1}} \begin{bmatrix} e^{j2\pi \cdot 0 \cdot \frac{l}{O_1 N_1}} \\ e^{j2\pi \cdot 1 \cdot \frac{l}{O_1 N_1}} \\ \vdots \\ e^{j2\pi \cdot (N_1-1) \cdot \frac{l}{O_1 N_1}} \end{bmatrix} \quad \text{Equation 1}$$

where $l=0, 1, \ldots O_1 N_1 - 1$ is the precoder index and $O_1$ is an integer oversampling factor. A precoder for a dual-polarized uniform linear array (ULA) with $N_1$ antennas per polarization (and so $2N_1$ antennas in total) can be similarly defined as $$w_{1D,DP}(l, N_1, O_1) = \begin{bmatrix} w_{1D}(l) \\ e^{j\phi} w_{1D}(l) \end{bmatrix} = \begin{bmatrix} w_{1D}(l) & 0 \\ 0 & w_{1D}(l) \end{bmatrix} \begin{bmatrix} 1 \\ e^{j\phi} \end{bmatrix} \quad \text{Equation 2}$$

where $e^{j\phi}$ is a cophasing factor between the two polarizations that may for instance be selected from a QPSK alphabet $\phi \in$ $$\left\{0, \frac{\pi}{2}, \pi, \frac{3\pi}{2}\right\}.$$

A corresponding precoder vector for a two-dimensional uniform planar arrays (UPA) with $N_1 \times N_2$ antennas can be created by taking the Kronecker product of two precoder vectors as $w_{2D}(l,m) = w_{1D}(l,N_1,O_1) \otimes w_{1D}(m,N_2,O_2)$, where $O_2$ is an integer oversampling factor in the $N_2$ dimension. Each precoder $w_{2D}(l,m)$ forms a DFT beam, all the precoders $\{w_{2D}(l,m), l=0, \ldots, N_1 O_1 - 1; m=0, \ldots, N_2 O_2 - 1\}$ form a grid of DFT beams. An example is shown in FIG. 6, where $(N_1,N_2)=(4,2)$ and $(O_1,O_2)=(4,4)$. In particular, FIG. 6 is a diagram of an example of oversampled DFT beams with $(N_1,N_2)=(4,2)$ and $(O_1,O_2)=(4,4)$. Throughout the following sections, the terms 'DFT beams' and 'DFT precoders' are used interchangeably.

More generally, a beam with an index pair (l,m) can be identified by the direction in which the greatest energy is transmitted when precoding weights $w_{2D}(l,m)$ are used in the transmission. Also, a magnitude taper can be used with DFT beams to lower the beam's sidelobes. A 1D DFT precoder along $N_1$ and $N_2$ dimensions with magnitude tapering can be expressed as $$w_{1D}(l, N_1, O_1, \beta) = \frac{1}{\sqrt{N_1}} \begin{bmatrix} \beta_0 e^{j2\pi \cdot 0 \cdot \frac{l}{O_1 N_1}} \\ \beta_1 e^{j2\pi \cdot 1 \cdot \frac{l}{O_1 N_1}} \\ \vdots \\ \beta_{N_1-1} e^{j2\pi \cdot (N_1-1) \cdot \frac{l}{O_1 N_1}} \end{bmatrix},$$

$$w_{1D}(m, N_2, O_2, \gamma) = \frac{1}{\sqrt{N_2}} \begin{bmatrix} \gamma_0 e^{j2\pi \cdot 0 \cdot \frac{m}{O_2 N_2}} \\ \gamma_1 e^{j2\pi \cdot 1 \cdot \frac{m}{O_2 N_2}} \\ \vdots \\ \gamma_{N_2-1} e^{j2\pi \cdot (N_2-1) \cdot \frac{m}{O_2 N_2}} \end{bmatrix},$$

where $0 < \beta_i, \gamma_k \leq 1$ ($i=0, 1, \ldots, N_1-1; k=0, 1, \ldots, N_2-1$) are amplitude scaling factors. $\beta_i=1$, $\gamma_k=1$ ($i=0, 1, \ldots, N_1-1$; $k=0, 1, \ldots, N_2-1$) correspond to no tapering. DFT beams (with or without a magnitude taper) have a linear phase shift between elements along each of the two dimensions. Without loss of generality, we assume that the elements of w(l,m) are ordered according to $w(l,m) = w_{1D}(l,N_1,O_1,\beta) \otimes w_{1D}(m, N_2,O_2,\gamma)$ such that adjacent elements correspond to adjacent antenna elements along dimension $N_2$, and elements of w(l,m) spaced $N_2$ apart correspond to adjacent antenna elements along dimension $N_1$. Then the phase shift between two elements $w_{s_1}(l,m)$ and $w_{s_2}(l,m)$ of $w(l,m)$ can be expressed as:

$$w_{s_2}(l, m) = w_{s_1}(l, m) \cdot \left(\frac{\alpha_{s_2}}{\alpha_{s_1}}\right) \cdot e^{j2\pi((k_1-i_1)\Delta_1 + (k_2-i_2)\Delta_2)}$$

where
$s_1 = i_1 N_2 + i_2$ and $s_2 = k_1 N_2 + k_2$ (with $0 \le i_2 < N_2$, $0 \le i_1 < N_1$, $0 \le k_2 < N_2$, and $0 \le k_1 < N_1$) are integers identifying two entries of the beam $w(l,m)$ so that $(i_1, i_2)$ indicates to a first entry of beam $w(l,m)$ that is mapped to a first antenna element (or port) and $(k_1, k_2)$ indicates to a second entry of beam $w(l,m)$ that is mapped to a second antenna element (or port). $\alpha_{s_1} = \beta_{i_1}\gamma_{i_2}$ and $\alpha_{s_2} = \beta_{k_1}\gamma_{k_2}$ are real numbers. $\alpha_i \ne 1$ ($i = s_1, s_2$) if magnitude tapering is used; otherwise $\alpha_i = 1$.

$$\Delta_1 = \frac{l}{O_1 N_1}$$

is a phase shift corresponding to a direction along an axis, e.g. the horizontal axis ("azimuth").

$$\Delta_2 = \frac{m}{O_2 N_2}$$

is a phase snip corresponding to direction along an axis, e.g. the vertical axis ("elevation").

Therefore, a $k^{th}$ beam $d(k)$ formed with precoder $w(l_k, m_k)$ can also be referred to by the corresponding precoder $w(l_k, m_k)$, i.e. $d(k) = w(l_k, m_k)$. Thus a beam $d(k)$ can be described as a set of complex numbers, each element of the set being characterized by at least one complex phase shift such that an element of the beam is related to any other element of the beam where $d_n(k) = d_i(k)\alpha_{i,n}e^{j2\pi(p\Delta_{1,k}+q\Delta_{2,k})} = d_i(k)\alpha_{i,n}(e^{j2\pi\Delta_{1,k}})^p(e^{j2\pi\Delta_{2,k}})^q$, where $d_i(k)$ is the $i^{th}$ element of a beam $d(k)$, $\alpha_{i,n}$ is a real number corresponding to the $i^{th}$ and $n^{th}$ elements of the beam $d(k)$; p and q are integers; and $\Delta_{1,k}$ and $\Delta_{2,k}$ are real numbers corresponding to a beam with index pair $(l_k, m_k)$ that determine the complex phase shifts $e^{j2\pi\Delta_{1,k}}$ and $e^{j2\pi\Delta_{2,k}}$, respectively. Index pair $(l_k, m_k)$ corresponds to a direction of arrival or departure of a plane wave when beam $d(k)$ is used for transmission or reception in a UPA or ULA. A beam $d(k)$ can be identified with a single index k where $= l_k + N_1 O_1 m_k$, i.e, along vertical or $N_2$ dimension first, or alternatively $k = N_2 O_2 l_k + m_k$, i.e. along horizontal or $N_1$ dimension first.

Extending the precoder for a dual-polarized ULA may then be done as $$w_{2D,DP}(l, m, \phi) = \begin{bmatrix} 1 \\ e^{j\phi} \end{bmatrix} \otimes w_{2D}(l, m) \begin{bmatrix} w_{2D}(l, m) \\ e^{j\phi} w_{2D}(l, m) \end{bmatrix} = \begin{bmatrix} w_{2D}(l, m) & 0 \\ 0 & w_{2D}(l, m) \end{bmatrix} \begin{bmatrix} 1 \\ e^{j\phi} \end{bmatrix} \quad \text{Equation 3}$$

A precoder matrix $W_{2D,DP}$ for multi-layer transmission may be created by appending columns of DFT precoder vectors as $$W_{2D,DP}^{(R)} = [w_{2D,DP}(l_1,m_1,\phi_1) \; w_{2D,DP}(l_2,m_2,\phi_2) \ldots w_{2D,DP}(l_R,m_R,\phi_R)]$$

where R is the number of transmission layers, i.e. the transmission rank. In a special case for a rank-2 DFT precoder, $m_1 = m_2 = m$ and $l_1 = l_2 = l$, there is $$W_{2D,DP}^{(2)}(l, m, \phi_1, \phi_2) = [w_{2D,DP}(l, m, \phi_1) \; w_{2D,DP}(l, m, \phi_2)] = \begin{bmatrix} w_{2D}(l, m) & 0 \\ 0 & w_{2D}(l, m) \end{bmatrix} \begin{bmatrix} 1 & 1 \\ e^{j\phi_1} & e^{j\phi_2} \end{bmatrix} \quad \text{Eq. 1}$$

For each rank, all the precoder candidates form a 'precoder codebook' or a 'codebook'. A wireless device can first determine the rank of the estimated downlink wideband channel based on CSI-RS. After the rank is identified, for each subband the wireless device then searches through all the precoder candidates in a codebook for the determined rank to find the best precoder for the subband. For example, in case of rank=1, the wireless device would search through $w_{2D,DP}(k,l,\phi)$ for all the possible $(k,l,\phi)$ values. In case of rank=2, the wireless device would search through $W_{2D,DP}^{(2)}(k,l,\phi_1,\phi_2)$ for all the possible $(k,l,\phi_1,\phi_2)$ values.

MU-MIMO

With multi-user MIMO, two or more users in the same cell are co-scheduled on the same time-frequency resource. That is, two or more independent data streams are transmitted to different wireless devices at the same time, and the spatial domain is used to separate the respective streams. By transmitting several streams simultaneously, the capacity of the system can be increased. This however, comes at the cost of reducing the signal to interference plus noise ratio (SINR) per stream, as the power has to be shared between streams and the streams will cause interference to each-other.

When increasing the antenna array size, the increased beamforming gain will lead to higher SINR, however, as the user throughput depends only logarithmically on the SINR (for large SINRs), it is instead beneficial to trade the gains in SINR for a multiplexing gain, which increases linearly with the number of multiplexed wireless devices.

Accurate CSI is required in order to perform appropriate null-forming between co-scheduled users. In the current LTE 3GPP Release 13 (Rel.13) standard, no special CSI mode for multi-user (MU)-MIMO exists and thus, MU-MIMO scheduling and precoder construction has to be based on the existing CSI reporting designed for single-user MIMO (that is, a PMI indicating a DFT-based precoder, a RI and a CQI). This may prove quite challenging for MU-MIMO, as the reported precoder only contains information about the strongest channel direction for a user and may thus not contain enough information to do proper null-forming, which may lead to a large amount of interference between co-scheduled users, reducing the benefit of MU-MIMO.

Multi-Beam Precoders

The DFT-based precoders discussed above and used in LTE Rel-13 calculate cophasing across pairs of (typically differently polarized) ports. If more than one beam $d(k)$ is used in CSI reporting, beams are not combined with the cophasing, but port pairs associated with a selected beam are cophased. Consequently, such DFT-based precoders can be considered as 'single beam' precoders. Multi-beam precoders are therefore an extension, where cophasing is applied across beams as well as port pairs. One such codebook is described herein. While the multi-beam codebook is described with two dimensions of the codebook relating to horizontal and vertical dimensions for concreteness, the codebook is equally applicable to a general case where the first or second dimension relates to horizontal or vertical antenna ports, as described above.

$D_N$ is defined as a size N×N DFT matrix, i.e. the elements of $D_N$ are defined as $$[D_N]_{k,l} = \frac{1}{\sqrt{N}} e^{j\frac{2\pi kl}{N}}.$$

Further, we define $$R_N(q) = \text{diag}\left(\left[ e^{j2\pi \cdot 0 \cdot \frac{q}{N}} \quad e^{j2\pi \cdot 1 \cdot \frac{q}{N}} \quad \ldots \quad e^{j2\pi \cdot (N-1) \cdot \frac{q}{N}} \right]\right)$$

to be a size N×N rotation matrix, defined for $0 \leq q < 1$. Multiplying $D_N$ with $R_N(q)$ from the left creates a rotated DFT matrix with entries $$[R_N(q)D_N]_{k,l} = \frac{1}{\sqrt{N}} e^{j\frac{2\pi k(l+q)}{N}}.$$

The rotated DFT matrix $R_N(q)D_N = [d_1 \ d_2 \ \ldots \ d_N]$ consist of normalized orthogonal column vectors $\{d_i\}_{i=1}^N$ which furthermore span the vector space $\mathbb{C}^N$. That is, the columns of $R_N(q)D_N$, for any q, is an orthonormal basis of $\mathbb{C}^N$.

A codebook design extending the (rotated) DFT matrices that were appropriate transforms for a single-polarized uniform linear array (ULA) as discussed above to also fit the more general case of dual-polarized 2D uniform planar arrays (UPAs) is a starting point. A rotated 2D DFT matrix as $D_{N_V,N_H}(q_V, q_H) = (R_{N_H}(q_H)D_{N_H}) \otimes (R_{N_V}(q_V)D_{N_V}) = [d_1 \ d_2 \ \ldots \ d_{N_V N_H}]$ is defined. The columns $\{d_i\}_{i=1}^{N_{DP}}$ of $D_{N_V,N_H}(q_V, q_H)$ constitutes an orthonormal basis of the vector space $\mathbb{C}^{N_V N_H}$. Such a column $d_i$ is henceforth denoted a (DFT) beam. A dual-polarized beam space transformation matrix suitable for a UPA is created, where the upper left and lower right elements correspond to the two polarizations:

$$B_{N_V,N_H}(q_V, q_H) =$$
$$I_2 \otimes D_{N_V,N_H}(q_V, q_H) = \begin{bmatrix} D_{N_V,N_H}(q_V, q_H) & 0 \\ 0 & D_{N_V,N_H}(q_V, q_H) \end{bmatrix} =$$
$$\begin{bmatrix} d_1 & d_2 & 0 & d_{N_V N_H} & 0 & 0 & \ldots & 0 \\ 0 & 0 & \ldots & 0 & d_1 & d_2 & \ldots & d_{N_V N_H} \end{bmatrix} =$$
$$[b_1 \ b_2 \ \ldots \ b_{2N_V N_H}].$$

The columns $\{b_i\}_{i=1}^{2N_V N_H}$ of $B_{N_V,N_H}(q_V, q_H)$ constitute an orthonormal basis of the vector space $\mathbb{C}^{2N_V N_H}$. Such a column $b_i$ is henceforth denoted a single-polarized beam (SP-beam) as it is constructed by a beam d transmitted on a single polarization $$\left(\text{i.e. } b = \begin{bmatrix} d \\ 0 \end{bmatrix} \text{ or } b = \begin{bmatrix} 0 \\ d \end{bmatrix}\right).$$

The notation dual-polarized beam is introduced to refer to a beam transmitted on both polarizations (which are combined with a polarization cophasing factor $e^{j\alpha}$, i.e.

$$b_{DP} = \begin{bmatrix} d \\ e^{j\alpha} d \end{bmatrix}.$$

Utilizing the assumption that the channel is somewhat sparse, sufficient channel energy is captured by only selecting a column subset of $B_{N_V,N_H}(q_V, q_H)$. That is, it is sufficient to describe a couple of the SP-beams, which keeps down the feedback overhead. So, select a column subset $I_S$ consisting of $N_{SP}$ columns of $B_{N_V,N_H}(q_V, q_H)$, to create a reduced beam space transformation matrix $B_{I_S} = [b_{I_S(1)} \ b_{I_S(2)} \ \ldots \ b_{I_S(N_{SP})}]$. E.g., select column numbers $I_S = [1 \ 5 \ 10 \ 25]$ to create the reduced beam space transformation matrix $B_{I_S} = [b_1 \ b_5 \ b_{10} \ b_{25}]$.

A general precoder structure for precoding of a single layer is:

$$w = B_{I_S} \begin{bmatrix} c_1 \\ c_2 \\ \vdots \\ c_{N_{SP}} \end{bmatrix} = [b_{I_S(1)} \ b_{I_S(2)} \ \ldots \ b_{I_S(N_{SP})}] \begin{bmatrix} c_1 \\ c_2 \\ \vdots \\ c_{N_{SP}} \end{bmatrix} = \sum_{i=1}^{N_{SP}} c_i b_{I_S(i)}.$$

where $\{c_i\}_{i=1}^{N_{SP}}$ are complex beam cophasing coefficients. The precoder w in the equation above is described as a linear combination of beams constructed by cophasing a $k^{th}$ beam $b_k$ with cophasing coefficient $c_k$. Such a beam cophasing coefficient is a complex scalar that adjusts at least the phase of a beam relative to other beams according to $c_k b_k$. When a beam cophasing coefficient only adjusts relative phase, it is a unit magnitude complex number. It is in general desirable to also adjust the relative gain of beams, in which case the beam cophasing coefficient is not unit magnitude.

A more refined multi-beam precoder structure is achieved by separating the complex coefficients in a power (or amplitude) and a phase part as $$w = B_{I_S} \begin{bmatrix} c_1 \\ c_2 \\ \vdots \\ c_{N_{SP}} \end{bmatrix} = B_{I_S} \begin{bmatrix} \sqrt{p_1} e^{j\alpha_1} \\ \sqrt{p_2} e^{j\alpha_2} \\ \vdots \\ \sqrt{p_{N_{SP}}} e^{j\alpha_{N_{SP}}} \end{bmatrix} =$$

$$B_{I_S} \begin{bmatrix} \sqrt{p_1} & 0 & & \\ 0 & \sqrt{p_2} & \ddots & \\ & & \ddots & 0 \\ & & 0 & \sqrt{p_{N_{SP}}} \end{bmatrix} \begin{bmatrix} e^{j\alpha_1} \\ e^{j\alpha_2} \\ \vdots \\ e^{j\alpha_{N_{SP}}} \end{bmatrix} = B_{I_S} \sqrt{P} \begin{bmatrix} e^{j\alpha_1} \\ e^{j\alpha_2} \\ \vdots \\ e^{j\alpha_{N_{SP}}} \end{bmatrix}$$

As multiplying the precoder vector w with a complex constant C does not change its beamforming properties (as only the phase and amplitude relative to the other single-polarized beams is of importance), one may without loss of generality assume that the coefficients corresponding to e.g. SP-beam 1 is fixed to $p_1 = 1$ and $e^{j\alpha_1} = 1$, so that parameters for one less beam needs to be signaled from the wireless device to the base station. Furthermore, the precoder may be further assumed to be multiplied with a normalization factor, so that e.g., a sum power constraint is fulfilled, i.e., that $\|w\|^2 = 1$. Any such normalization factor is omitted from the equations herein for clarity.

In some cases, the possible choices of columns of $B_{N_V,N_H}(q_V,q_H)$ are restricted so that if column $i=i_0$ is chosen, so is column $i=i_0+N_V N_H$. That is, if an SP-beam corresponding to a certain beam mapped to the first polarization is chosen, e.g.

$$b_{i_0} = \begin{bmatrix} d_{i_0} \\ 0 \end{bmatrix},$$

this would imply that the SP-beam $$b_{i_0+N_V N_H} = \begin{bmatrix} 0 \\ d_{i_0} \end{bmatrix}$$

is chosen as well. That is, the SP-beam corresponding to the said certain beam mapped to the second polarization is chosen as well. This would reduce the feedback overhead as only $N_{DP}=N_{SP}/2$ columns of $B_{N_V,N_H}(q_V,q_H)$ would have to be selected and signaled back to the base station. In other words, the column selection is done on a beam (or DP-beam) level rather than an SP-beam level. If a certain beam is strong on one of the polarizations it would typically imply that the beam would be strong on the other polarization as well, at least in a wideband sense, so the loss of restricting the column selection in this way would not significantly decrease the performance. In the following discussion, the use of DP-beams is generally assumed (unless stated otherwise).

In some cases, the multi-beam precoder is factored into two or more factors that are selected with different frequency-granularity, in order to reduce the feedback overhead. In such cases, the SP-beam selection (i.e. the choice of matrix $B_{I_S}$) and the relative SP-beam powers/amplitudes (i.e. the choice of matrix $\sqrt{P}$) is selected with a certain frequency-granularity while the SP-beam phases (i.e. the choice of matrix $$\begin{bmatrix} e^{j\alpha_1} \\ e^{j\alpha_2} \\ \vdots \\ e^{j\alpha_{N_{SP}}} \end{bmatrix}$$

is selected with another certain frequency-granularity. In one such case, the said certain frequency-granularity corresponds to a wideband selection (that is, one selection for the entire bandwidth) while the said another certain frequency-granularity corresponds to a per-subband selection (that is, the carrier bandwidth is split into a number of subbands, typically consisting of 1-10 physical resource blocks (PRBs), and a separate selection is done for each subband).

In a typical such case, the multi-beam precoder vector is factored as $w=W_1 W_2$, where $W_1$ is selected with a certain frequency-granularity and $W_2$ is selected with another certain frequency-granularity. The precoder vector may then be expressed as $$w = \underbrace{B_{I_S}\sqrt{P}}_{=W_1} \underbrace{\begin{bmatrix} e^{j\alpha_1} \\ e^{j\alpha_2} \\ \vdots \\ e^{j\alpha_{N_{SP}}} \end{bmatrix}}_{=W_2} = W_1 W_2.$$

Using this notation, if the said certain frequency-granularity corresponds to a wideband selection of $W_1$ and the said another certain frequency-granularity corresponds to a per-subband selection of $W_2$, the precoder vector for subband 1 may be expressed as $w_l = W_1 W_2(l)$. That is, only $W_2$ is a function of the subband index $l$.

Recently, 3GPP has specified a multi beam precoder design in its new advanced CSI codebook supporting one and two spatial layers with the following form in 3GPP TS 36.213 section 7.2.4, with 2 beams;

$$W^v_{k_1,k_2,m_1,m_2,p,q_1,q_2,q_3} = \frac{1}{\sqrt{P(1+p^2)}} \begin{bmatrix} v_{k_1,k_2} + p\varphi_{q_3} v_{k_1+m_1,k_2+m_2} \\ \varphi_{q_1}(v_{k_1,k_2} + p\varphi_{q_2} v_{k_1+m_1,k_2+m_2}) \end{bmatrix},$$

$$v = 1, 2$$

For one layer:

$$W_{k_1,k_2,m_1,m_2,p,q_1,q_2,q_3}^{(1)} = W_{k_1,k_2,m_1,m_2,p,q_1,q_2,q_3}^{1},$$

and for two layers:

$$W^{(2)}_{k_1,k_2,m_1,m_2,p,q_{1,1},q_{2,1},q_{3,1},q_{1,2},q_{2,2},q_{3,2}} = \frac{1}{\sqrt{2}} \begin{bmatrix} W^1_{k_1,k_2,p,m_1,m_2,q_{1,1},q_{2,1},q_{3,1}} & W^2_{k_1,k_2,p,m_1,m_2,q_{1,2},q_{2,2},q_{3,2}} \end{bmatrix}$$

where:

$$\varphi_n = e^{j\pi n/2}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

Here, $v_{l,m}$ corresponds to a 2-dimensional beam $b_{I_S(i)}$ as defined above. This is referred to as a 2 beam codebook in 3GPP, since $v_{l,m}$ and $v_{k_1+m_1,k_2+m_2}$ are chosen on a wideband basis, and if an SP-beam $v_{l,m}$ or $v_{k_1+m_1,k_2+m_2}$ corresponding to a certain beam mapped to the first polarization is chosen, e.g.

$$b_{i_0} = \begin{bmatrix} d_{i_0} \\ 0 \end{bmatrix},$$

this means that the SP-beam $$b_{i_0+N_V N_H} = \begin{bmatrix} 0 \\ d_{i_0} \end{bmatrix}$$

is chosen, as described above. In this sense, there are two wideband dual polarized beams, and each of the 4 single polarized components of the 2 beams are combined independently on a subband basis. Therefore, the sums $$\begin{bmatrix} v_{k_1,k_2} + \varphi_{q_3} p v_{k_1+m_1,k_2+m_2} \\ \varphi_{q_1}\left(v_{k_1,k_2} + \varphi_{q_2} p v_{k_1+m_1,k_2+m_2}\right) \end{bmatrix}$$

can be equivalently written as $$\begin{bmatrix} c_1 v_{k_1,k_2} + c_3 p v_{k_1+m_1,k_2+m_2} \\ c_2 v_{k_1,k_2} + c_4 p v_{k_1+m_1,k_2+m_2} \end{bmatrix} \begin{bmatrix} \sum_{i=0}^{N_{SP}/2-1} c_{2i+1} d_i \\ \sum_{i=1}^{N_{SP}/2} c_{2i} d_i \end{bmatrix} = \sum_{i=1}^{N_{SP}} c_i b_{I_S(i)} = w$$

with $N_{sp}=2N_{dp}=4$, with $c_1=1$. It can also be observed from 3GPP TS 36.213 section 7.2.4 that indices $q_1$, $q_2$, and $q_3$ correspond to the codebook index $i_2$. The codebook index $i_2$ can be a subband PMI, as it can be reported per subband, and corresponds to $W_2$ as defined above. It can be observed that if p=0, that is if a single beam $v_{k_1,k_2}$ is used, then only index $q_1$ affects the value of $W_{k_1,k_2,m_1,m_2,p,q_1,q_2,q_3}v$, and so subband PMI for the first beam is identified by $q_1$. Furthermore, $q_2$, and $q_3$ affect the relative phase of the second beam $v_{k_1+m_1,k_2+m_2}$ to the first beam $v_{k_1,k_2}$, and therefore can identify the subband PMI corresponding to a second beam.

Finally, the relative power p in 3GPP TS 36.213 is identified by a relative power indicator ('RPI'), and designated as $I_p$ therein.

SUMMARY

One problem with existing systems is how to acquire CSI feedback for NR where the transmission schemes can be dynamically selected for each new DL-SCH scheduling. A solution is to configure CSI feedback for all possible transmission schemes and CSI feedback types in parallel so that the network node has all the information. A problem with this approach is the overhead and wireless device complexity.

Another problem is how to exploit the features of the PUSCH for better spectral efficiency when reporting CSI. Periodically reported CSI in LTE is designed for transmission on the PUCCH, and so is less spectrally efficient and/or provides lower resolution CSI than CSI reported on the PUSCH. Additionally, CSI reported on the PUSCH is not designed for very large variably sized payloads in LTE, and the network node is not aware if the CSI size overflows the resource allocation it provides when requesting an aperiodic report, which forces the network node to allocate excess resources to ensure there is no overflow. Finally, CSI can't be retransmitted in the PUSCH, which reduces the spectral efficiency of CSI feedback.

Some embodiments of the present disclosure aim to solve some of the noted problems by using the PUSCH, instead of the PUCCH, to carry CSI in semi-persistent CSI reporting. As discussed below in detail, in some of these embodiments, control signaling identifies at least one characteristic of how CSI should be transmitted. In some of these embodiments, one or more of the following are applicable:

Semi-persistent CSI reporting is activated or deactivated dynamically by using DCI. The reference network node to wireless device transmission scheme (used to compute CSI), CSI feedback type and other related CSI parameters such as CSI-RS resource are also indicated in the DCI.

More specifically, the wireless device can be configured with multiple CSI reporting settings using higher layer signaling from the network node and the DCI that activates semi-persistent CSI reporting selects one of the CSI report settings. A CSI report setting contains a transmission scheme, CSI feedback type and other related CSI parameters.

The PUSCH resource is allocated dynamically in the DCI based on the CSI payload size according to the reference transmission scheme and CSI feedback type.

Modulation, coding rate, and/or number of layers for the PUSCH transmission can also be specified in the DCI.

Long CSI reports can be split into multiple PUSCH transmissions.

The base station can be informed when CSI message sizes are larger than expected.

Aperiodic CSI can be retransmitted to improve spectral efficiency for CSI reporting. Such retransmissions may use HARQ with multiple redundancy versions for further enhanced efficiency.

According to one aspect, a user equipment for transmitting semi-persistent Channel State Information, SP CSI, on a physical uplink shared channel, PUSCH, is provided. The user equipment includes processing circuitry configured to receive a control signaling message for configuring the user equipment with at least one SP CSI report configuration on the PUSCH, the message identifying a SP CSI reporting periodicity; and receive physical layer control signaling for identifying and activating the at least one SP CSI report configuration. The user equipment also includes transmitter circuitry configured to transmit a plurality of SP CSI reports, the reports being transmitted with the SP CSI reporting periodicity and according to the physical layer control signaling and the control signaling message.

According to this aspect, in some embodiments, the processing circuitry is further configured to receive physical layer control signaling to de-activate a previously activated SP CSI report configuration. In some embodiments, the control signaling message is a radio resource control, RRC, message. In some embodiments, the at least one SP CSI report configuration includes at least one SP CSI report setting. In some embodiments, the at least one SP CSI report configuration includes at least one SP CSI resource setting or an association to at least one SP CSI resource setting. In some embodiments, the at least one SP CSI report setting includes at least a CSI feedback type. In some embodiments, the at least one SP CSI report setting includes at least a frequency band over which the SP CSI is to be measured and reported. In some embodiments, the at least one SP CSI report setting further includes a slot offset for each of the at least one SP CSI report configuration. In some embodiments, the at least one SP CSI report configuration further includes a special cell radio network temporary identifier, C-RNTI. In some embodiments, the at least one SP CSI resource setting includes at least one of a resource for channel measurement and a resource for interference measurement.

In some embodiments, the physical layer control signaling is a downlink control information, DCI, signaling on a physical downlink control channel, PDCCH. In some embodiments, the physical layer control signaling includes information about resource allocation and modulation for the PUSCH carrying a plurality of SP CSI reports. In some embodiments, the physical control signaling includes a coding rate. In some embodiments, the identifying includes information about the at least one SP CSI report configuration in the downlink control information, DCI. In some embodiments, the activating is implicitly indicated by a combination of bit fields in the downlink control information, DCI. In some embodiments, the special cell radio network temporary identifier, C-RNTI, is used to scramble a cyclic redundancy check, CRC, bits corresponding to the downlink control information, DCI, wherein, optionally, the special CRNTI is used only to scramble the DCI used for one of activating and deactivating the at least one SP CSI report configuration. In some embodiments, at least one of the activating or deactivating of the at least one SP CSI report configuration is partly indicated by the special cell radio network temporary identifier, C-RNTI, used in scrambling a cyclic redundancy check, CRC, bits corresponding to the downlink control information, DCI, in the physical layer control signaling. In some embodiments, a plurality of SP CSI reports from different user equipments can be multiplexed in the PUSCH. In some embodiments, the multiplexing is spatial multiplexing. In some embodiments, different components of a plurality of SP CSI reports are coded independently. In some embodiments, the processing circuitry is further configured to receive physical layer control signaling for identifying at least one characteristic of measuring and transmitting SP CSI. In some embodiments, the at least one SP CSI report configuration includes an association to at least one SP CSI resource setting.

According to another aspect, a method in a user equipment for transmitting semi-persistent Channel State Information, SP CSI, on a physical uplink shared channel, PUSCH, is provided. The method includes receiving a control signaling message, the control signaling message configuring the user equipment with at least one SP CSI report configuration on the PUSCH, and the message identifying a SP CSI reporting periodicity. The method also includes receiving physical layer control signaling identifying and activating the at least one SP CSI report. The method also includes transmitting a plurality of SP CSI reports, the reports being transmitted with the periodicity and according to the physical layer control signaling and the control signaling message.

In some embodiments, the method further includes receiving physical layer control signaling to de-activate a previously activated SP CSI report configuration. In some embodiments, the control signaling message is a radio resource control, RRC, message. In some embodiments, the at least one SP CSI report configuration include at least one SP CSI report setting. In some embodiments, the at least one SP CSI report configuration includes at least one SP CSI resource settings or an association to at least one SP CSI resource setting. In some embodiments, the at least one SP CSI report setting includes at least a CSI feedback type. In some embodiments, the at least one SP CSI report setting includes at least a frequency band over which the SP CSI is to be measured and reported. In some embodiments, the at least one SP CSI report setting further includes a slot offset for each of the at least one SP CSI report configuration. In some embodiments, the at least one SP CSI report configuration further includes a special cell radio network temporary identifier, C-RNTI. In some embodiments, the at least one SP CSI resource setting includes at least one of a resource for channel measurement and a resource for interference measurement. In some embodiments, the physical layer control signaling is a downlink control information, DCI, signaling on a physical downlink control channel, PDCCH.

In some embodiments, the physical layer control signaling includes information about resource allocation and modulation for the PUSCH carrying a plurality of SP CSI reports. In some embodiments, the physical control signaling includes a coding rate. In some embodiments, the identifying includes information about the at least one SP CSI report configuration in the downlink control information, DCI. In some embodiments, at least one of the activating or deactivating is implicitly indicated by a combination of bits corresponding to the downlink control information, DCI. In some embodiments, the special cell radio network temporary identifier, C-RNTI, is used to scramble a cyclic redundancy check, CRC, bits corresponding to the downlink control information, DCI, wherein, optionally, the special C-RNTI is used only to scramble the DCI used for activating or deactivating the at least one SP CSI report configuration. In some embodiments, at least one of the activating or deactivating of the at least one SP CSI report configuration is partly indicated by the special cell radio network temporary identifier, C-RNTI, used in scrambling a cyclic redundancy check, CRC, bits corresponding to the downlink control information, DCI, in the physical layer control signaling. In some embodiments, the plurality of SP CSI reports from different user equipments can be multiplexed in the PUSCH. In some embodiments, the multiplexing is spatial multiplexing. In some embodiments, different components of the plurality of SP CSI reports are coded independently. In some embodiments, the physical layer control signaling identifies at least one characteristic of measuring and transmitting SP CSI.

According to another aspect, a base station for adaptively configuring semi-persistent Channel State Information, SP CSI, on a physical uplink shared channel, PUSCH is provided. The base station includes processing circuitry configured to transmit a control signaling message to configure a user equipment with at least one SP CSI report configuration on the PUSCH, the message identifying a SP CSI reporting periodicity. In some embodiments, transmit physical layer control signaling identifying and activating the at least one SP CSI report configuration; and receiver circuitry configured to receive a plurality of SP CSI reports, the reports being transmitted with the periodicity and according to the physical layer control signaling and the control signaling message.

According to this aspect, in some embodiments, the processing circuitry is further configured to transmit physical layer control signaling to de-activate a previously activated SP CSI report configuration. In some embodiments, the control signaling message is a radio resource control, RRC, message. In some embodiments, the at least one SP CSI report configuration includes at least one SP CSI report setting. In some embodiments, the at least one SP CSI report configuration includes at least one SP CSI resource settings or an association to at least one SP CSI resource setting. In some embodiments, the physical layer control signaling identifies at least one characteristic of measuring and transmitting SP CSI.

According to yet another aspect, a method in a base station for adaptively configuring semi-persistent Channel State Information, SP CSI, on a physical uplink shared channel, PUSCH, is provided. The method includes transmitting a control signaling message to configure a user equipment with at least one SP CSI report configuration on the PUSCH, the message identifying a SP CSI reporting periodicity. The method also includes transmitting physical layer control signaling identifying and activating the at least one SP CSI report. The method also includes receiving a plurality of SP CSI reports, the reports being transmitted with the periodicity and according to the physical layer control signaling and the control signaling message.

According to this aspect, in some embodiments, the method further includes transmitting physical layer control signaling to de-activate a previously activated SP CSI report configuration. In some embodiments, the control signaling message is a radio resource control, RRC, message. In some embodiments, the at least one SP CSI report configuration includes at least one SP CSI report setting. In some embodiments, the at least one SP CSI report configuration includes at least one SP CSI resource settings or an association to at least one SP CSI resource setting. In some embodiments, the physical layer control signaling identifies at least one characteristic of measuring and transmitting SP CSI.

According to yet another aspect, a user equipment for transmitting semi-persistent Channel State Information, SP CSI, on a physical uplink shared channel, PUSCH, is provided. The user equipment includes a receiver module configured to: receive a control signaling message, the control signaling message configuring the user equipment with at least one SP CSI report configuration on the PUSCH, and the message identifying a SP CSI reporting periodicity; and to receive physical layer control signaling identifying and activating the at least one SP CSI report configuration. The user equipment includes a a transmitter module configured to transmit a plurality of SP CSI reports, the reports being transmitted with the periodicity and according to the physical layer control signaling and the control signaling message.

According to this aspect, in some embodiments, the physical layer control signaling identifies at least one characteristic of measuring and transmitting SP CSI. In some embodiments, the at least one SP CSI report configuration includes an association to at least one SP CSI resource setting.

According to another aspect, a base station for adaptively configuring semi-persistent Channel State Information, SP CSI, on a physical uplink shared channel, PUSCH, is provided. The base station includes a transmitter module configured to: transmit a control signaling message to configure a user equipment with at least one SP CSI report configuration on the PUSCH, the message identifying a SP CSI reporting periodicity, and to transmit physical layer control signaling identifying and activating the at least one SP CSI report configuration. A receiver module is configured to receive a plurality of SP CSI reports, the reports being transmitted with the periodicity and according to the physical layer control signaling and the control signaling message.

According to this aspect, in some embodiments, the physical layer control signaling identifies at least one characteristic of measuring and transmitting SP CSI. In some embodiments, the at least one SP CSI report configuration includes an association to at least one SP CSI resource setting.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
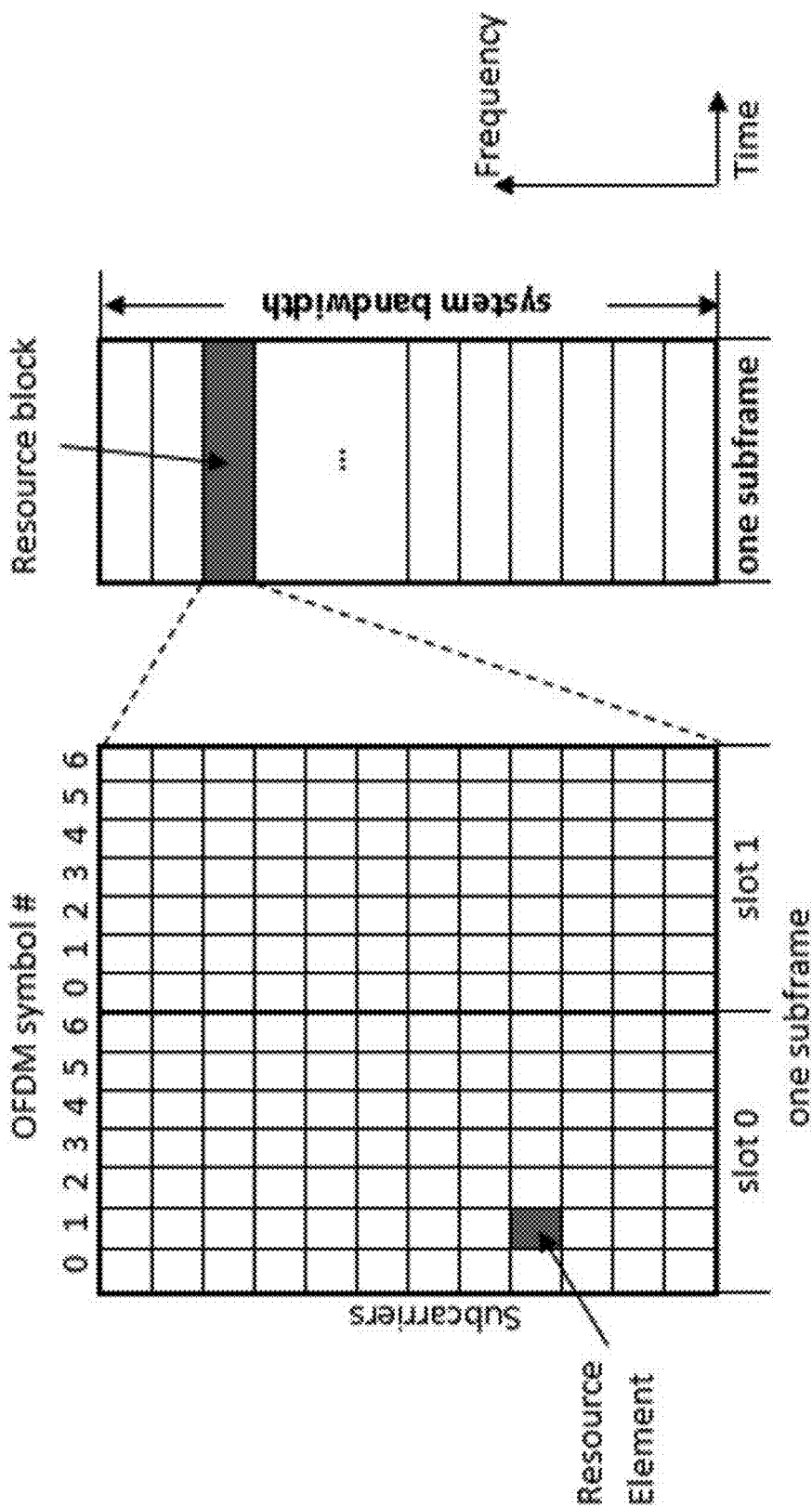
FIG. 1 is a diagram of LTE physical resources.
Figure 2:
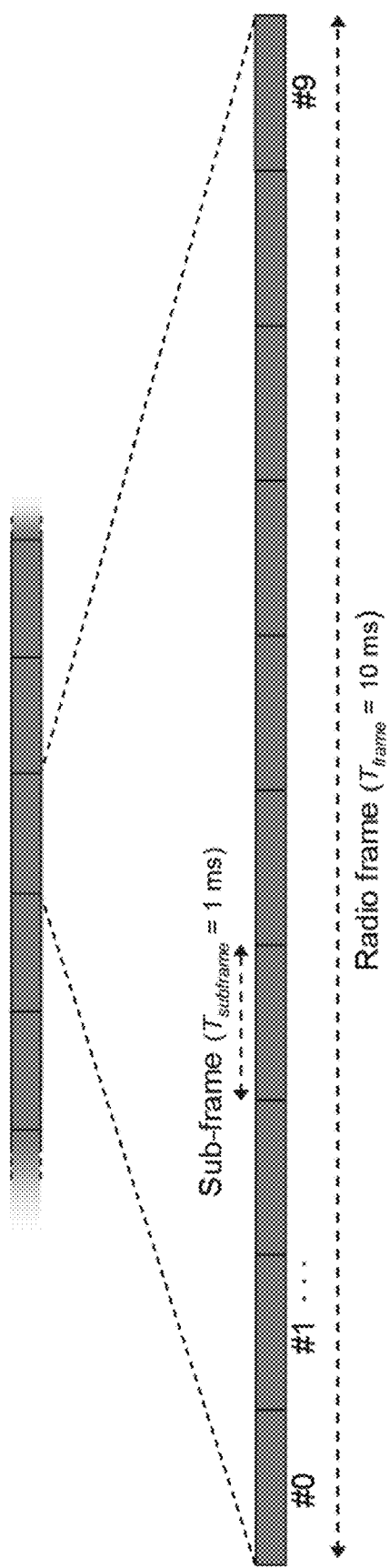
FIG. 2 is a diagram of an LTE time-domain structure with 15 kHz subcarrier spacing.
Figure 3:
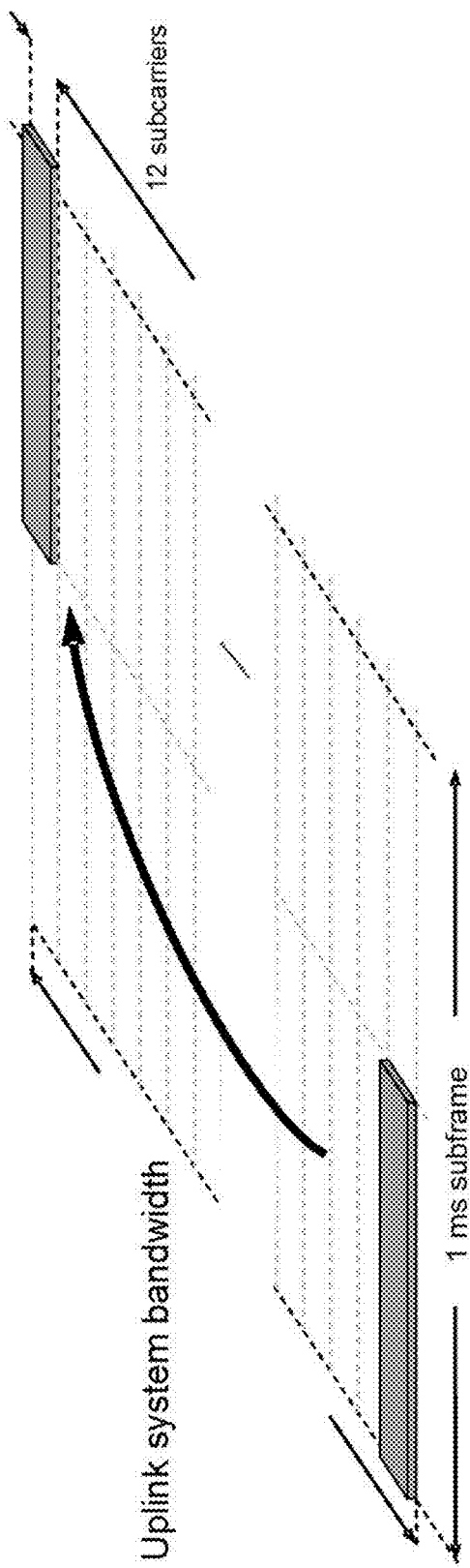
FIG. 3 is a diagram of an Uplink L1/L2 control signaling transmission on PUCCH.
Figure 4:
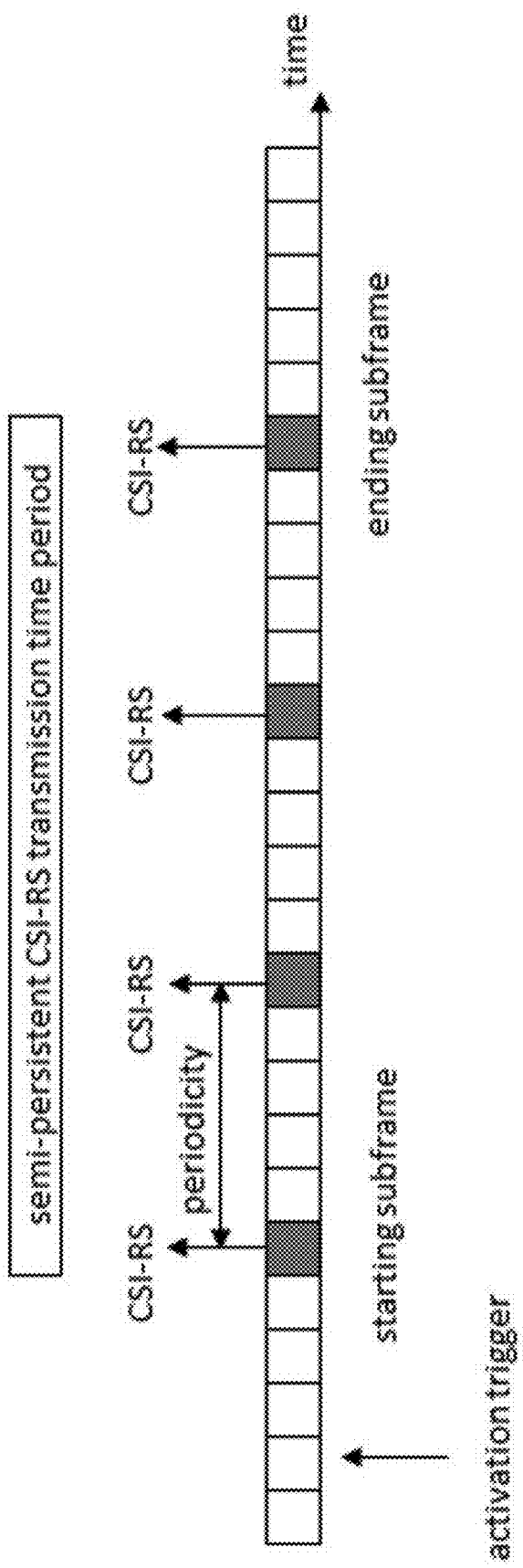
FIG. 4 is diagram of semi-persistent CSI-RS transmission.
Figure 5:
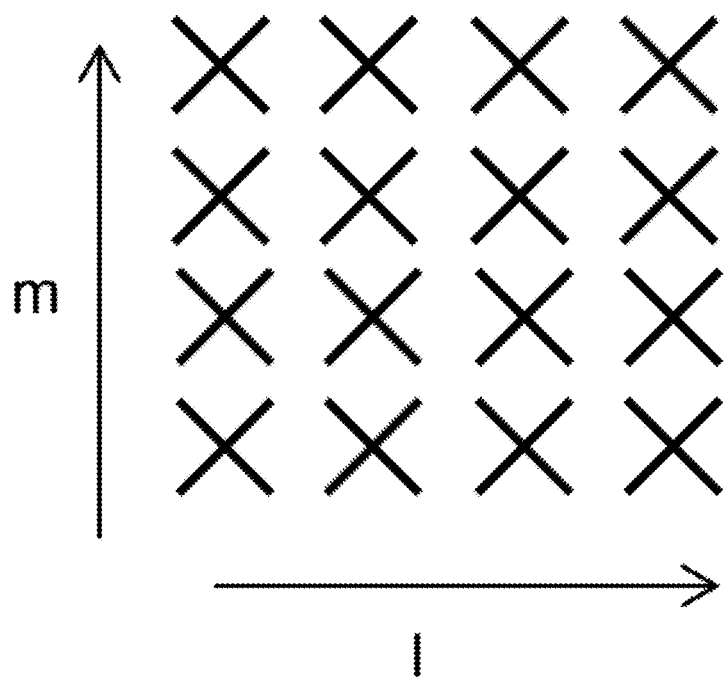
FIG. 5 is a diagram of a two-dimensional antenna array of cross-polarized antenna elements.
Figure 6:
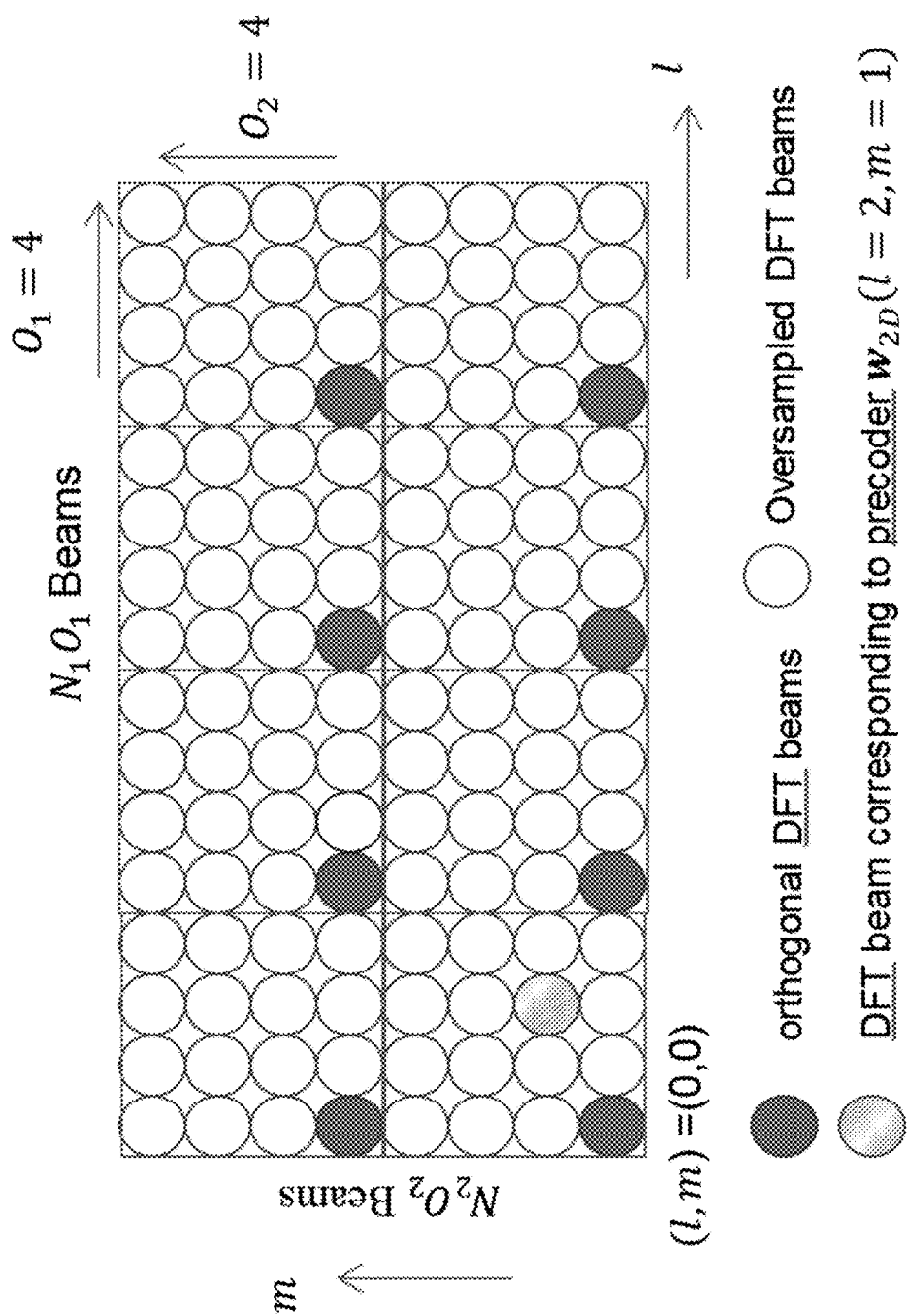
FIG. 6 is a diagram of an example of oversampled DFT beams.

Some embodiments according to the present disclosure may provide none, some or all of the following benefits:
- Able to obtain CSI feedback for different transmission schemes and CSI feedback types, allowing dynamic switching of transmission schemes to adapt to channel and/or interference changes;
- Dynamic allocation of resources adapting to the CSI payload size, so more efficient resource utilization can be achieved;
- CSI reports need not be subsampled to fit into the PUCCH, nor do PUCCH resources need to be configured when CSI are transmitted periodically; and The integrity of CSI is always protected and link adaptation is possible for CSI reporting through retransmission.

The teachings in the instant disclosure may be used with two-dimensional antenna arrays and some of the presented embodiments use such antennas.

Before describing in detail exemplary embodiments, it is noted that the embodiments reside primarily in combinations of apparatus components and processing steps related to methods, wireless devices and network nodes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

It should be understood that, in some embodiments, signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that it represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that the RRC signaling as described herein may indicate what subframes or signals to use for one or more of the measurements described herein and under what conditions and/or operational modes.

Configuring a radio node, in particular a terminal or user equipment or a wireless device, may refer to the radio node being adapted or caused or set and/or instructed to operate according to the configuration. Configuring may be done by another device, e.g., a network node 12 (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 14) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Also note that terminology such as eNodeB and wireless device should be considered non-limiting and does in particular not imply a certain hierarchical relation between the two; in general "eNodeB" could be considered as device 1 and "wireless device" device 2, and these two devices communicate with each other over some radio channel. Also, while the disclosure focuses on wireless transmissions in the downlink, embodiments are equally applicable in the uplink.

The term "wireless device" used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, a sensor equipped with UE, PDA, iPAD, Tablet, mobile terminals, smart phone, laptop embedded equipped (LEE), laptop mounted equipment (LME), USB dongles, computer premises equipment (CPE), etc.

The term "network node" used herein may refer to a radio network node or another network node, e.g., a core network node, MSC, MME, O&M, OSS, SON, positioning node (e.g. E-SMLC), MDT node, etc.

The term "network node" or "radio network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., $3^{rd}$ party node, a node external to the current network), nodes in distributed antenna system (DAS) etc. The network node may also comprise test equipment. The term "radio node" used herein may be used to also denote a wireless device such as a UE or a radio network node.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Figure 7:
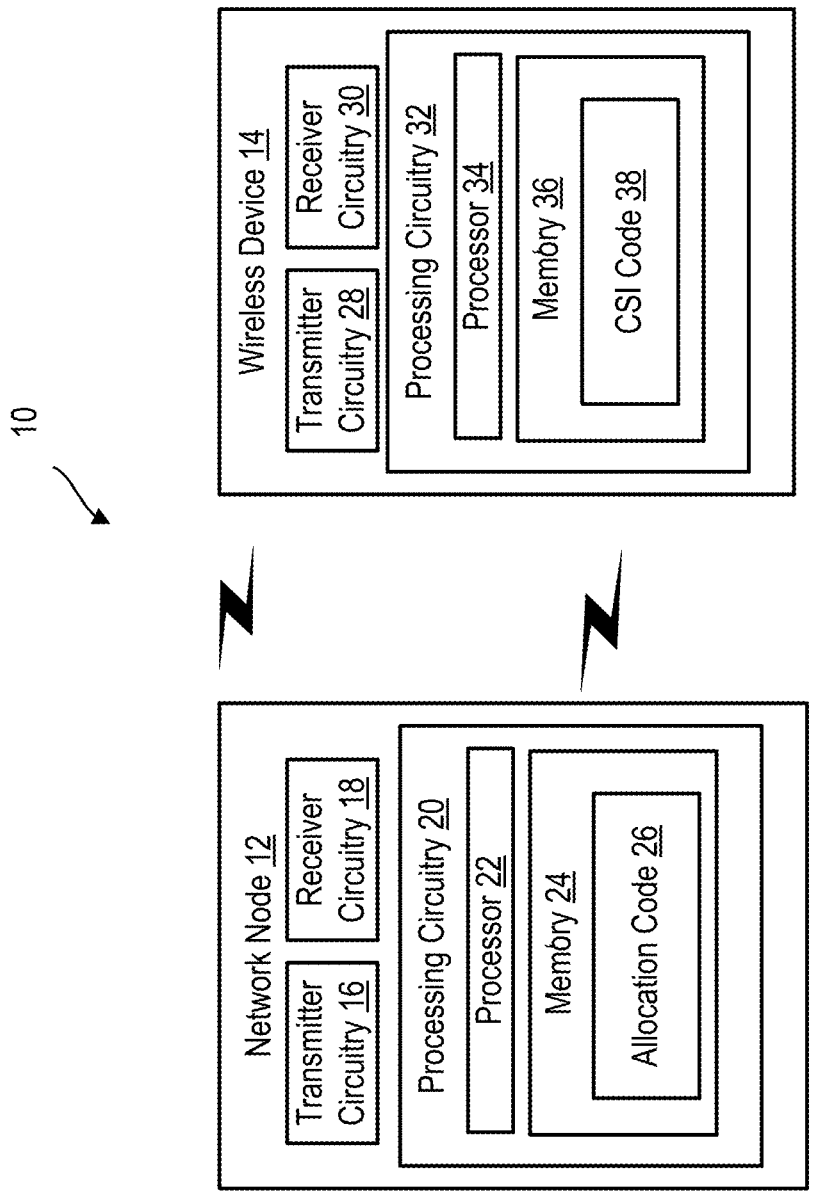
FIG. 7 is a block diagram of an exemplary system for CSI feedback in accordance with the principles of the disclosure.

Referring now to drawing figures in which like reference designators refer to like elements there is shown in FIG. 7 is a block diagram of an exemplary system for CSI feedback in accordance with the principles of the disclosure. System 10 includes one or more one or more network nodes 12 and one or more wireless devices 14, in communication with each other via one or more communication networks, paths and/or links using one or more communication protocols such as LTE and/or NR based protocols.

Network node 12 includes transmitter circuitry 16 and receiver circuitry 18 for communicating with wireless device 14, other network nodes 12 and/or other entities in system 10. In one or more embodiments, transmitter circuitry 16 and receiver circuitry 18 includes or is replaced by one or more communication interfaces.

Network node 12 includes node processing circuitry 20. Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc.

Processing circuitry 20 may be configured to control any of the methods and/or processes described herein and/or to cause such methods, signaling and/or processes to be performed, e.g., by network node 12. Processor 22 corresponds to one or more processors for performing network node 12 functions described herein. Network node 12 includes memory 24 that is configured to store data, programmatic software code and/or other information described herein. In one or more embodiments, memory 24 is configured to store allocation code 26. For example, allocation code 26 includes instructions that, when executed by processor 22, causes processor 22 to perform the processes describe herein with respect to network node 12.

The term "network node 12" used herein can be any kind of network node comprised in a radio network which may further comprise any of base station (BS), radio base station, base transceiver station (BTS), base station controller (BSC), radio network controller (RNC), gNodeB, evolved Node B (eNB or eNodeB), Node B, gNB, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

It is contemplated that the functions of network node 12 and wireless device 14 described herein are not limited to performance by a single physical device and, in fact, can be distributed among several physical devices locally or across a network cloud such as a backhaul network and/or the Internet.

Wireless device 14 includes transmitter circuitry 28 and receiver circuitry 30 for communicating with network node 12, other wireless devices 14 and/or other entities in system 10. In one or more embodiments, transmitter circuitry 28 and receiver circuitry 30 include or are replaced by one or more communication interfaces.

Wireless device 14 includes processing circuitry 32. Processing circuitry 32 includes processor 34 and memory 36. In addition to a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or reading from) memory 36, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 36 may be configured to store code executable by processor 34 and/or other data, e.g., data pertaining to communication, e.g., configuration and/or address data of nodes, etc.

Processing circuitry 32 may be configured to control any of the methods and/or processes described herein and/or to cause such methods, signaling and/or processes to be performed, e.g., by wireless device 14. Processor 34 corresponds to one or more processors 34 for performing wireless device 14 functions described herein. Wireless device 14 includes memory 36 that is configured to store data, programmatic software code and/or other information described herein. In one or more embodiments, memory 36 is configured to store CSI code 38. For example, CSI code 38 includes instructions that, when executed by processor 34, causes processor 34 to perform the processes describe herein with respect to wireless device 14.

Wireless device 14 may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Figure 8:
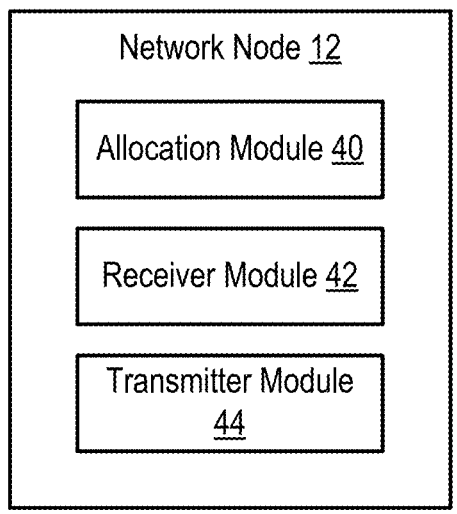
FIG. 8 is a block diagram of another embodiment of a network node in accordance with the principles of the disclosure.

FIG. 8 is a block diagram of another embodiment of network node 12 in accordance with the principles of the disclosure. Network node 12 includes allocation module 40, receiver module 42 and transmitter module 44 for performing the functions described herein with respect to allocation code 26, transmitter circuitry 16 and receiver circuitry 18.

Figure 9:
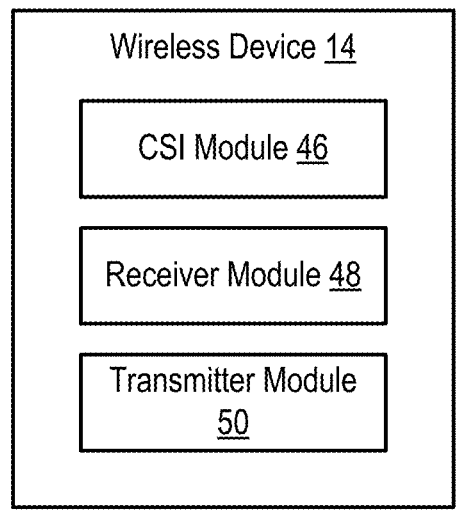
FIG. 9 is a block diagram of another embodiment of a wireless device in accordance with the principles of the disclosure.

FIG. 9 is a block diagram of another embodiment of wireless device 14 in accordance with the principles of the disclosure. Wireless device 14 includes CSI module 46, receiver module 48 and transmitter module 50 for performing the functions described herein with respect to CSI code 38, transmitter circuitry 28 and receiver circuitry 30.

Figure 10:
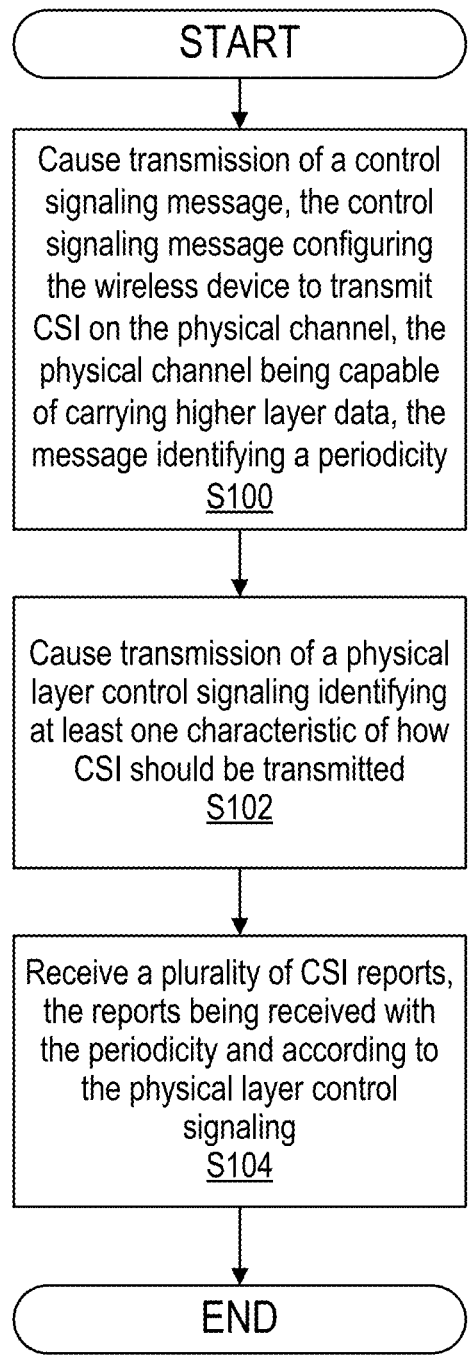
FIG. 10 is a flow diagram of an allocation process performed by allocation code in accordance with the principles of the disclosure.

FIG. 10 is a flow diagram of an example allocation process performed by allocation code 26 in accordance with the principles of the disclosure. Processing circuitry 20 causes transmission of a control signaling message to wireless device 14, as described herein (Block S100). The control signaling message configures the wireless device 14 to transmit CSI on the physical channel where the physical channel is capable of carrying higher layer data and the message identifies a periodicity, as described herein. Processing circuitry 20 causes transmission of a physical layer control signaling identifying at least one characteristic of how CSI should be transmitted, as described herein (Block S102). In one or more embodiments, the at least one characteristic is at least one of a modulation state, a number of spatial layers, and a number of physical channel resources containing at least the CSI report, as described herein. It is contemplated that other characteristics can be implemented and that embodiments are not limited solely to those described herein. Processing circuitry 20 receives a plurality of CSI reports, the reports being received with the periodicity and according to the physical layer control signaling, as described herein (Block S104). For example, receiver circuitry, in communication with processing circuitry, receives a plurality of CSI reports, the reports being received with the periodicity and according to the physical layer control signaling.

Figure 11:
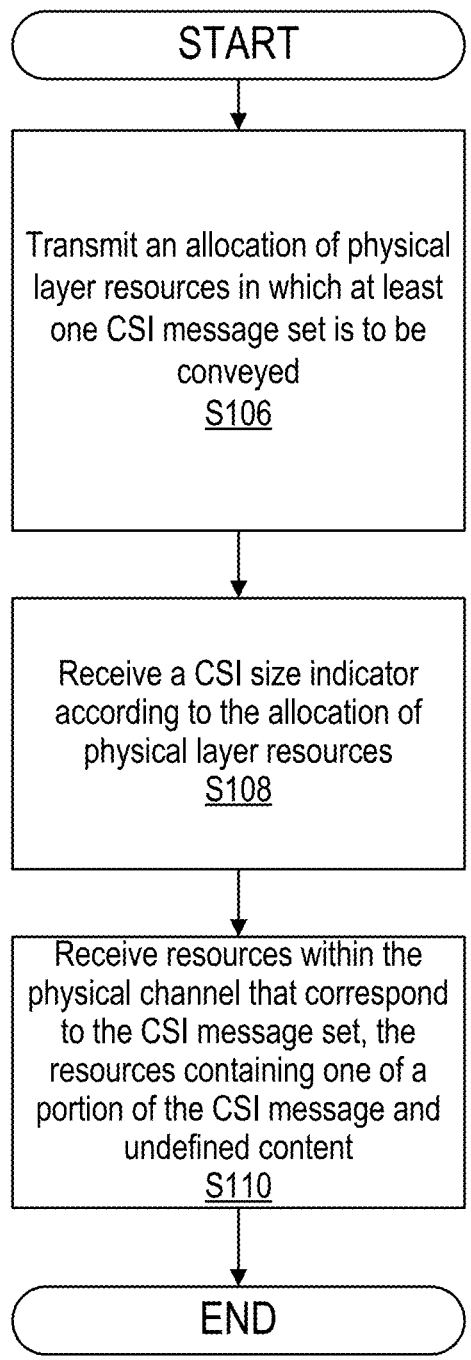
FIG. 11 is a flow diagram of an alternative allocation process performed by the allocation code in accordance with the principles of the disclosure.

FIG. 11 is a flow diagram of an alternative allocation process performed by allocation code 26 in accordance with the principles of the disclosure. Processing circuitry 20 causes transmission, via transmitter circuitry 16, of an allocation of physical layer resources in which at least one CSI message set is to be conveyed, as described herein (Block S106). Processing circuitry 20 receives, via receiver circuitry 18, a CSI size indicator according to the allocation of physical layer resources, as described herein (Block S108). Processing circuitry 20 receives, via receiver circuitry 18, resources within the physical channel that correspond to the CSI message set, the resources containing one of a portion of the CSI message and undefined content, as described herein (Block S110).

Figure 12:
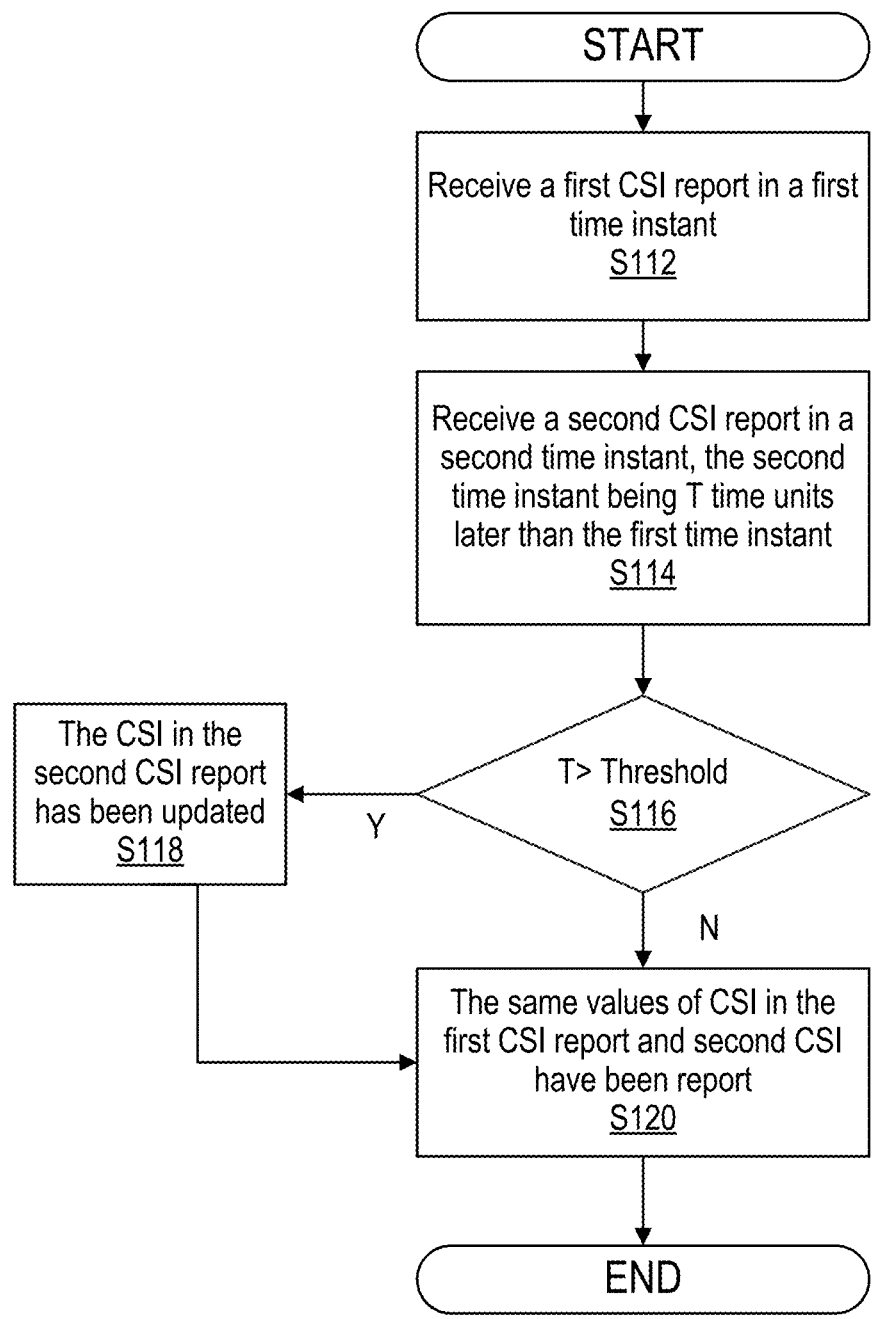
FIG. 12 is a flow diagram of yet another allocation process performed by allocation code in accordance with the principles of the disclosure.

FIG. 12 is a flow diagram of yet another alternative allocation process performed by allocation code 26 in accordance with the principles of the disclosure. Processing circuitry 20 receives, via receiver circuitry 18, a first CSI report in a first time instant, as described herein (Block S112). Processing circuitry receives, via receiver circuitry 18, a second CSI report in a second time instant, as described herein (Block S114). In one or more embodiments, the second time instant is T time units later than the first time instant.

Processing circuitry 20 determines whether T is greater than a threshold (Block S116). If T is greater than the threshold, processing circuitry 20 determines that the CSI in the second CSI report has been updated, as described herein (Block S118). If T is less than the threshold, processing circuitry 20 determines that the same values of CSI in the first CSI report and second CSI have been reported, as described herein (Block S120).

Figure 13:
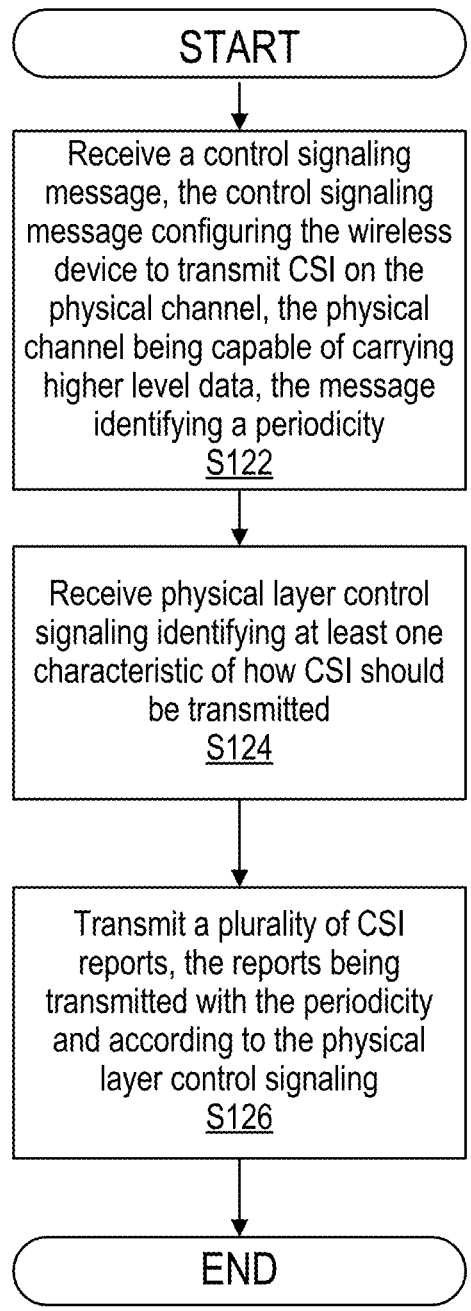
FIG. 13 is an exemplary flow diagram of a code process performed by CSI code in accordance with the principles of the disclosure.

FIG. 13 an exemplary flow diagram of a code process performed by CSI code 38 in accordance with the principles of the disclosure. Processing circuitry 32 receives, via receiver circuitry 30, a control signaling message, as described herein (Block S122). In one or more embodiments, the control signaling message configures the wireless device 14 to transmit CSI on the physical channel where the physical channel is capable of carrying higher layer data and the message identifies a periodicity. Processing circuitry 32 receive, via receiver circuitry 30, physical layer control signaling identifying at least one characteristic of how CSI should be transmitted (Block S124). In one or more embodiments, the at least one characteristic is at least one of a modulation state, a number of spatial layers, and a number of physical channel resources containing at least the CSI report, as described herein. It is contemplated that other characteristics can be implemented and that embodiments are not limited solely to those described herein. Processing circuitry 20 transmits, via transmitter circuitry 28, a plurality of CSI reports, as discussed herein (Block S126). In one or more embodiments, the reports are transmitted with the periodicity and according to the physical layer control signaling.

Figure 14:
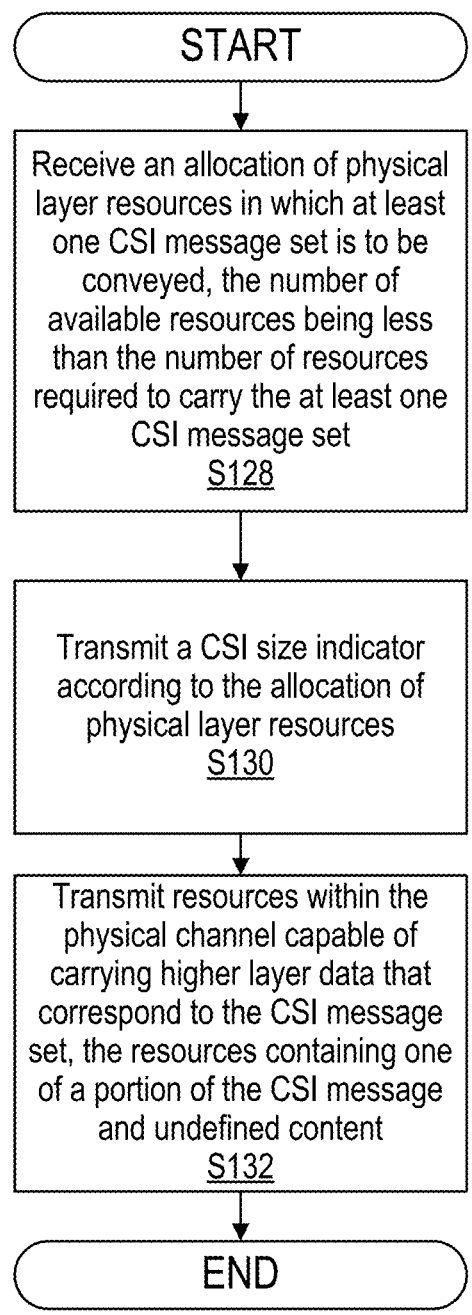
FIG. 14 is a flow diagram of an alternative code process performed by CSI code in accordance with the principles of the disclosure.

FIG. 14 is a flow diagram of an alternative code process performed by CSI code 38 in accordance with the principles of the disclosure. Processing circuitry 32 receives, via receiver circuitry 30, an allocation of physical layer resources in which at least one CSI message set is to be conveyed, as described herein (Block S128), where the number of available resources is less than the number of resources required to carry the at least one CSI message set Processing circuitry 32 transmits, via transmitter circuitry 28, a CSI size indicator according to the allocation of physical layer resources, as described herein (Block S130). Processing circuitry 32 transmits, via transmitter circuitry 28, resources within the physical channel that correspond to the CSI message set, the resources containing one of a portion of the CSI message and undefined content, as described herein (Block S132).

Figure 15:
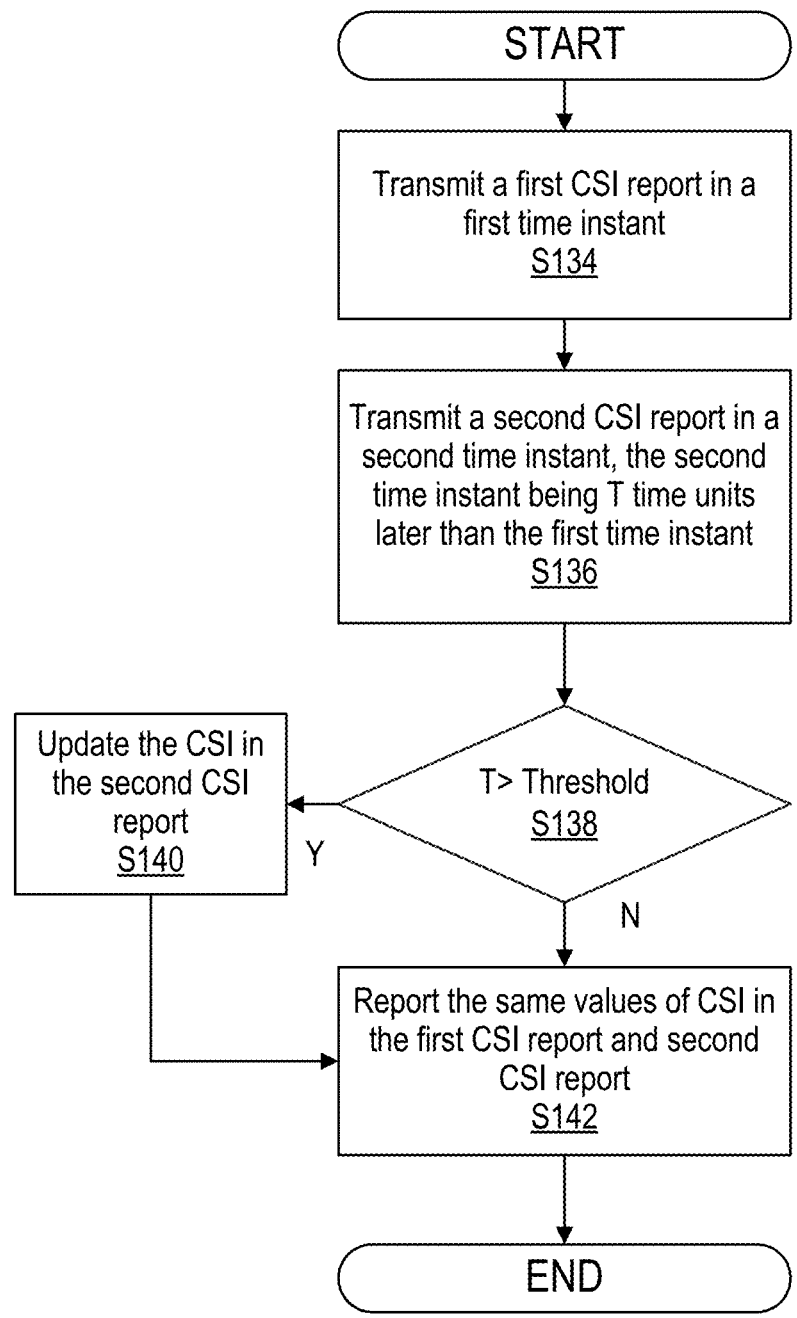
FIG. 15 is a flow diagram of yet another alternative code process performed by CSI code in accordance with the principles of the disclosure.

FIG. 15 is a flow diagram of yet another alternative code process performed by CSI code 38 in accordance with the principles of the disclosure. Processing circuitry 32 transmits, via transmitter circuitry 28, a first CSI report in a first time instant, as described herein (Block S134). Processing circuitry 32, via transmitter circuitry 28, transmits a second CSI report in a second time instant, as described herein (Block S136). In one or more embodiments, the second time instant is T time units later than the first time instant. Processing circuitry 32 determines whether T is greater than a threshold, as described herein (Block S138). If T is greater than the threshold, processing circuitry 32 updates the CSI in the second CSI report, as described herein (Block S140). If T is less than the threshold, processing circuitry 32 reports the same values of CSI in the first CSI report and second CSI report, as described herein (Block S142).

Figure 16:
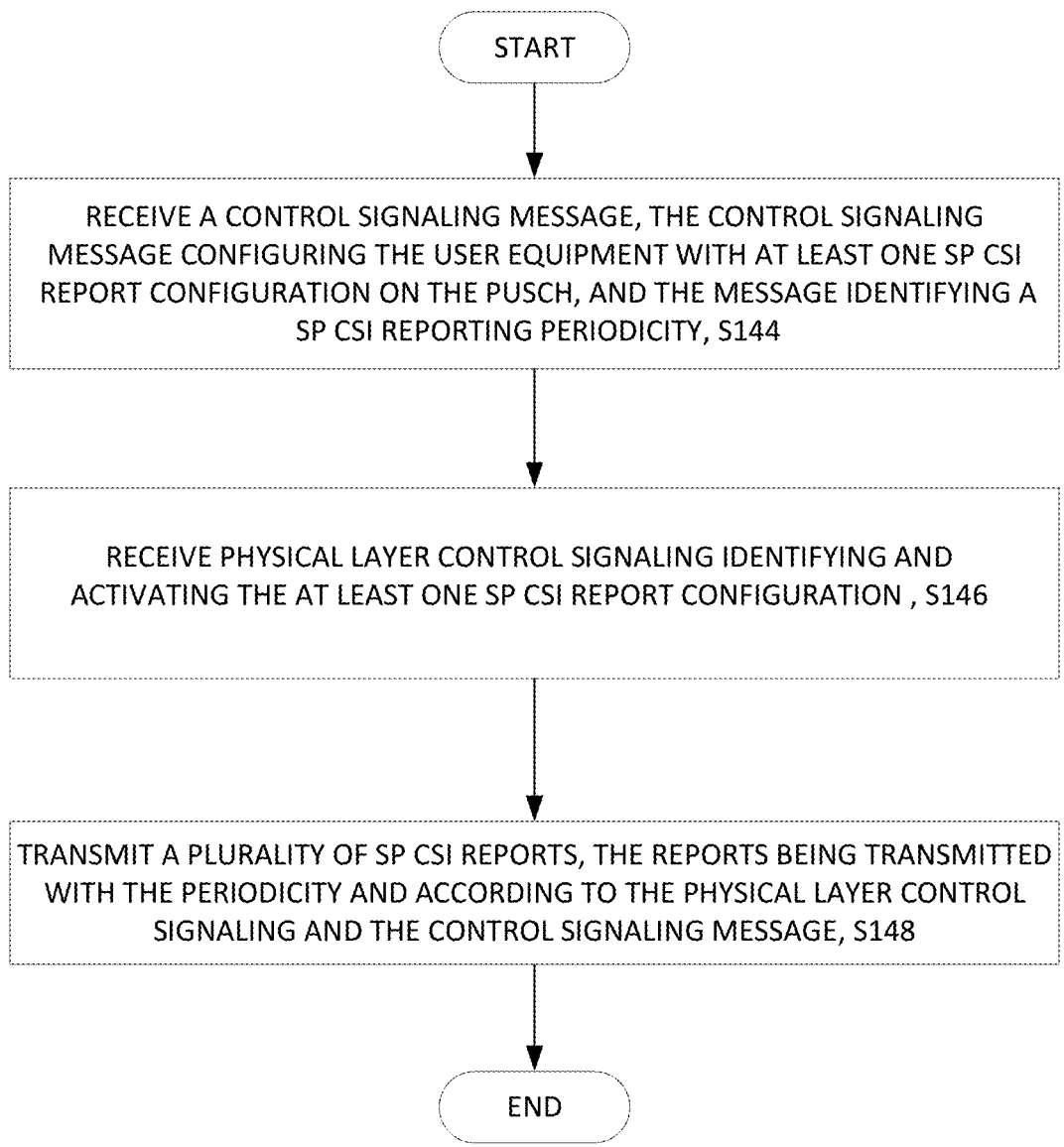
FIG. 16 is a flow diagram of an exemplary process in a wireless device in accordance with principles of this disclosure.

FIG. 16 is a flowchart of an exemplary process in a wireless device 14 for transmitting semi-persistent Channel State Information, SP CSI, on a physical uplink shared channel, PUSCH. The process includes receiving, via the receiver circuitry 30, a control signaling message, the control signaling message configuring the wireless device 14 with at least one SP CSI report configuration on the PUSCH, and the message identifying a SP CSI reporting periodicity (block S144). The process also includes receiving, via the receiver circuitry 30, physical layer control signaling identifying and activating the at least one SP CSI report configuration and at least one characteristic of how SP CSI should be measured and transmitted (block S146). The process further includes transmitting, via the transmitter circuitry 28, a plurality of SP CSI reports, the reports being transmitted with the periodicity and according to the physical layer control signaling and the control signaling message (block S148).

Figure 17:
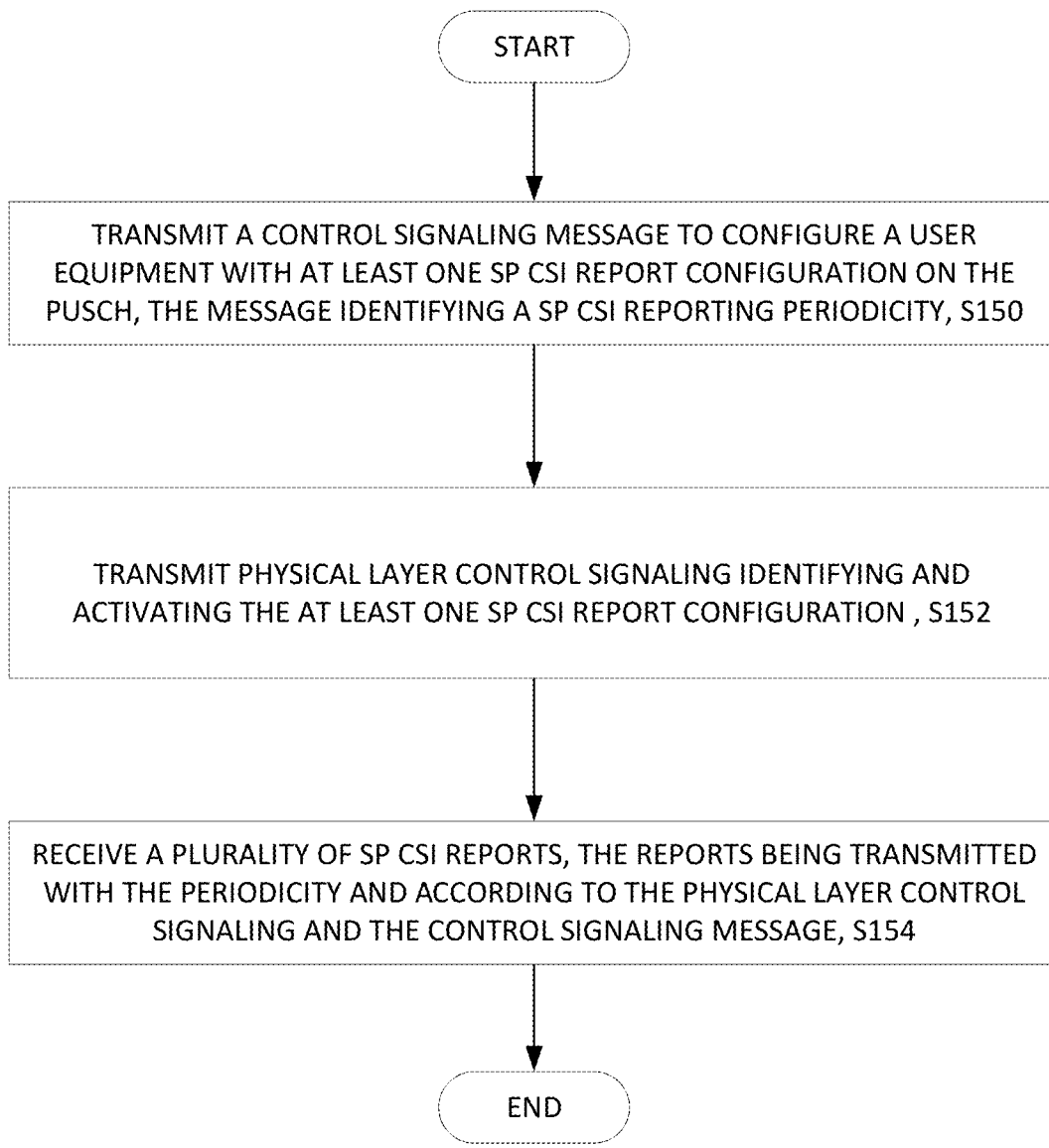
FIG. 17 is a flow diagram of an exemplary process in a network node in accordance with principles of this disclosure.

FIG. 17 is a flowchart of an exemplary process in a network node 12 for adaptively configuring semi-persistent Channel State Information, SP CSI, on a physical uplink shared channel, PUSCH. The process includes transmitting, via transmitter circuitry 16, a control signaling message to configure a wireless device 14 with at least one SP CSI report configuration on the PUSCH, the message identifying a SP CSI reporting periodicity (block S150). The process also includes transmitting, via transmitter circuitry 16, physical layer control signaling identifying and activating the at least one SP CSI report configuration and at least one characteristic of how SP CSI should be measured and transmitted (block S152). The process also includes receiving, via receiver circuitry 18, a plurality of SP CSI reports, the reports being transmitted with the periodicity and according to the physical layer control signaling and the control signaling message (block S154).

For periodic CSI reporting, the CSI is carried on the PUCCH (except when it collides with the PUSCH in a subframe for the same wireless device 14, in which case UCI is piggy backed on the PUSCH). The maximum CSI payload size would be known by the gNB based on the configured downlink transmission scheme for which to feedback CSI, and the CSI feedback type for the periodic CSI reporting. PUCCH resources would be semi-statically reserved/configured for the WD based on the CSI payload size.

Although semi-persistent CSI reporting will be supported in NR, it is unclear whether CSI will be carried on the PUCCH or the PUSCH. In case of semi-persistent CSI reporting based on periodic CSI-RS transmission, the semi-persistent CSI reporting can be considered as a time windowed version of periodic CSI reporting.

In case of semi-persistent CSI reporting based on semi-persistent CSI-RS transmission, one option is to consider it as a time windowed version of both periodic CSI-RS transmission and periodic CSI reporting. In this case, other than the dynamic activation and deactivation part, the rest of the higher layer configurations can be the same as configuring periodic CSI reporting.

However, this means that only a single transmission scheme is configured and the CSI reporting corresponds to only the configured transmission scheme and CSI feedback type. Given that one of the goals of NR is an ability to switch transmission schemes dynamically, such a CSI feedback for only one transmission scheme is not desirable.

In another option, different transmission schemes and CSI feedback types are dynamically indicated during the activation of semi-persistent CSI reporting. In this case, the PUCCH resource needs to be reserved based on the worst case maximum CSI payload size among all the transmission schemes and CSI feedback types, which is clearly not efficient in resource utilization.

While LTE can transmit periodic CSI reports on the PUSCH scheduled by semi-persistent resource allocation in order to improve the link adaptation for periodic CSI transmission, such CSI reports are generally less accurate than aperiodic CSI on the PUSCH. This is because the CSI must fit into the small payload of the PUCCH. Furthermore, the PUCCH resources must be allocated when periodic CSI reporting is configured, which wastes PUCCH resources if the corresponding periodic CSI is only carried on the PUSCH.

Figure 18:
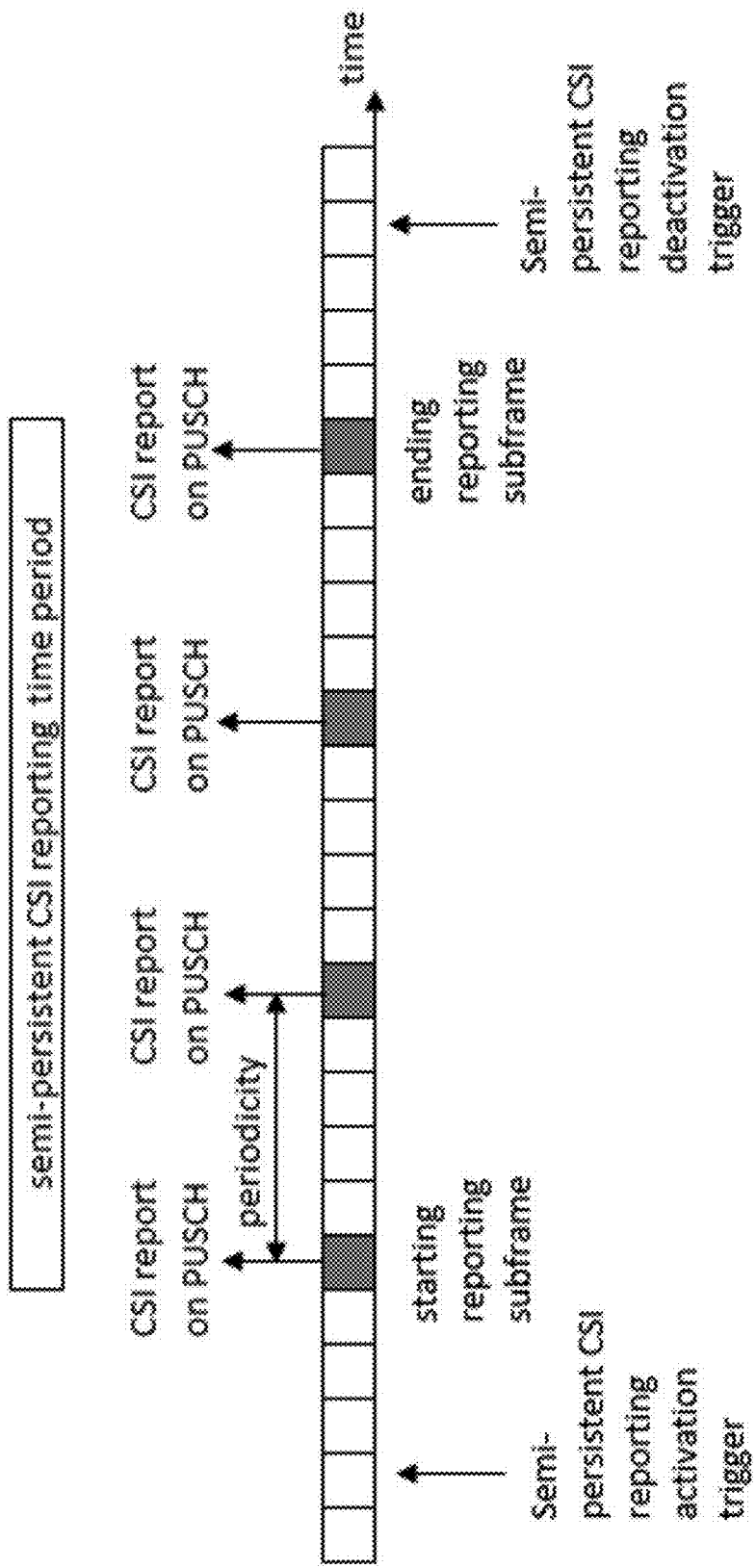
FIG. 18 is a diagram semi-persistent CSI reporting over PUSCH in accordance with the principles of the disclosure.

In one embodiment, semi-persistent CSI reporting is activated by using DCI over the PDCCH and the CSI is reported on the PUSCH periodically until the semi-persistent CSI reporting is deactivated as shown in FIG. 18. In particular, FIG. 18 is a diagram of semi-persistent CSI reporting over the PUSCH in accordance with the principles of the disclosure.

The subframes over which CSI is reported are semi-persistently configured through higher layer signaling, such as periodicity and subframe offset. The activation DCI may contain one or more of the following information:
  Semi-persistent CSI activation/deactivation indication;
  CSI-RS resource(s) over which CSI is to be measured;
  Transmission scheme toward which the CSI is to be measured;
  CSI feedback type, e.g. Type I or Type II feedback;
  Frequency band over which the CSI is to be measured and reported;
  PUSCH resource allocation; and
  Modulation and coding rate.

The semi-persistent CSI activation/deactivation indication can be either explicitly or implicitly signalled. In the case of explicit signaling, one or more dedicated bit field(s) in DCI can be used. In case of implicit signaling, a combination of certain fields in DCI may be used for the purpose.

Some of the parameters such as transmission scheme and CSI feedback type may be included in CSI reporting settings configured by the higher layers. In this case, only the index of the reporting setting is signalled in the DCI. In an alternative embodiment, transmission scheme may be defined in one of the links in the CSI measurement setting. Similarly, CSI-RS resources may be included in the CSI-RS resource settings and/or resource sets configured by the higher layers and the index of resource setting and/or CSI-RS resource set may be signalled in the DCI.

Similar to UCI transmission on the PUSCH in LTE for aperiodic CSI reporting, RI, ACK/NACK, CQI/PMI information can be independently encoded with different coding rates and/or transmit power offsets to provide different levels of protection. For robust CSI feedback, rank one or only rank one transmission may be configured for the PUSCH. In some cases, CSI feedback for multiple wireless devices 14 may be scheduled in the same PUSCH resources as long as network node 12 can reliably receive the CSI feedback from multiple wireless devices 14 in the PUSCH. This may be possible when multiple wireless devices 14 are well separated spatially and/or when network node 12 can rely on multi-antenna receiver processing techniques to separate the CSI feedback from multiple wireless devices 14. By allocating the same PUSCH resources to carry CSI feedback from multiple wireless devices 14, the overall PUSCH resource allocation overhead can be reduced.

To distinguish from a PDCCH used for regular PUSCH transmission, a semi-persistent scheduling (SPS) C-RNTI may be allocated to wireless device 14 and used to scramble the CRC (Cyclic Redundancy Check) bits in the corresponding PDCCH.

In one embodiment, the semi-persistent CSI reporting can be used to periodically update CSI to keep up with potential channel variations.

Figure 19:
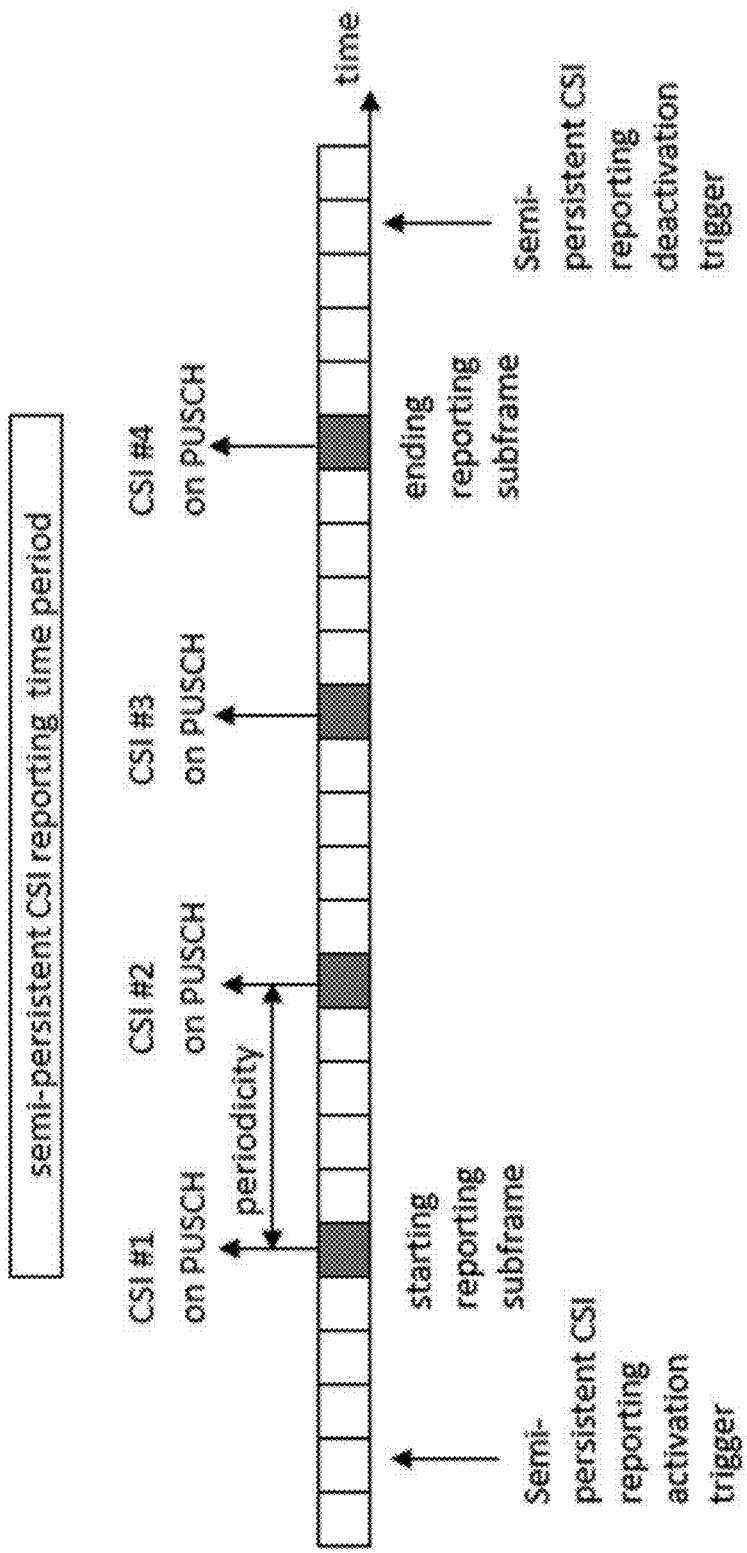
FIG. 19 is a diagram of CSI reporting over multiple instances using semi-persistent CSI reporting in accordance with the principles of the disclosure.

In another embodiment, it can be used to report a single large full resolution CSI message over multiple reports as shown in FIG. 19, in which reports from CSI #1 to CSI #4 represent coarse reports and can be used to form a CSI report with higher resolution. FIG. 19 is a diagram of CSI reporting over multiple instances using semi-persistent CSI reporting in accordance with the principles of the disclosure. In such a case, wireless device 14 is configured to report a specific subset of the CSI in each of the reports. For example, if wireless device 14 is configured for a Type II or LTE advanced CSI report that comprises subband PMI corresponding to a linear combination of two different beams, then report CSI#1 could carry subband PMI corresponding to beam one, and report CSI#2 could carry the subband PMI for beam two. In some embodiments, the subband PMI for a first beam is identified by a first index associated with a single complex number, and the subband PMI for a second beam is identified by two indices associated with two complex numbers.

In a similar embodiment, when there is too much CSI data to transmit in one CSI report, portions of the complete CSI are transmitted in each of the CSI reports CSI #1 to CSI #4. Additionally, one or more CSI message size indicators that indicate the size of the complete CSI may be transmitted in each of the CSI reports. The CSI message size indicators as well as their values are identical in each of the CSI reports CSI #1 to CSI #4. A CSI message size indicator can be a CSI parameter such as RI, CRI, and/or RPI that identifies the size of a CSI message to transmit. Forward error correction coding is applied to CSI information bits not containing the CSI message size indicators, so that the CSI message size indicators can be independently decoded from CSI message information bits whose size is identified by the CSI message size indicators. This allows the size of the CSI information bits in the CSI messages to vary while allowing simple determination of the complete CSI size by decoding only the CSI message size indicators.

A CSI message set may be defined herein as the set of complete CSI messages for all cells, CSI processes, and/or eMIMO-Types that correspond to a given CSI report trigger. If the CSI message set contains CSI messages for multiple cells, CSI processes, or eMIMO-Types, then one or more CSI message size indicators are transmitted for each CSI message in the CSI message set, such that the size of the CSI message set can be determined by the receiving network node 12.

Receiving network node 12 can determine the contents of each CSI report such as CSI #1 to CSI #4 because once the size of the complete CSI message(s) in the CSI message set are known, the content and format of each CSI message and therefore each CSI report on the PUSCH is known. For each CSI report, wireless device 14 transmits the remaining bits of the CSI message set that fit into the report, and saves any further bits that are not yet transmitted for a later CSI report, until there are no CSI messages from the CSI message set that have not yet been fully transmitted.

In some embodiments, when there is too much CSI data to transmit in one CSI report, wireless device 14 indicates that the CSI message set to be carried in the report has excess size, and the full CSI is not transmitted. Wireless device 14 first calculates one or more CSI messages to be reported in a CSI message set according to a CSI report trigger, determining the number of information bits in the CSI message set. Wireless device 14 then determines if the CSI message would occupy more uplink physical channel resources than are available in an uplink grant associated with the CSI report trigger. If the CSI message would occupy more uplink resources than are available, then wireless device 14 transmits a complete set of CSI message size indicators, but not the complete CSI.

In an embodiment, wireless device 14 determines the available number of physical resources $Q$ as the total number of physical resource elements available for uplink control and/or higher layer data as provided by the resource allocated in the uplink grant. Wireless device 14 determines the number of resource elements used for CSI other than the message size indicators, $Q_{CQI}$, and the number of resource elements used for the CSI message size indicator(s), $Q_{RI}$. $Q_{CQI}$ may include resource elements containing RI, CRI, and/or RPI corresponding to one or more cells, CSI processes, and/or eMIMO-Types. $Q_{RI}$ may include resource elements containing RI, CRI, and/or RPI corresponding to one or more cells CSI processes, and/or eMIMO-Types. The number of resource elements needed for a CSI message set is then $Q_{CQI} + Q_{RI}$. In some embodiments, wireless device 14 may also determine the number of resource elements used for other information than the CSI message set such as higher layer data, $Q_{other}$, while in other embodiments $Q_{other}=0$ always, even if uplink resource allocations include higher layer data.

If $Q_{CQI} + Q_{RI} + Q_{other} > Q$, then the CSI message set size is greater than that will fit in the allocated resources. In general, when CSI reports are large, $Q_{CQI} \gg Q_{RI}$, and so it is likely that the CSI message size indicators will fit in the allocated resources, that is, $Q_{RI} \leq Q$. Therefore, when $Q_{CQI} + Q_{RI} + Q_{other} > Q$, wireless device 14 reports the CSI message size indicator using a number of layers $v_{RI}$ on which the CSI message indicator is to be transmitted and the determined number of resource elements $Q_{RI}$. The CSI report as well as any other information beside the CSI report, such as higher layer data, is then transmitted using $Q = Q_{RI} + Q'_{CQI} + Q_{other}$, where $Q'_{CQI} = Q - Q_{RI} - Q_{other}$, and where $Q_{other}$ is the number of resource elements used for other information beside the CSI report such as higher layer data, if any. The $Q'_{CQI}$ resource elements may contain a portion of the CSI other than the message size indicators, such as the first $v_{CQI} Q_m Q'_{CQI}$ bits of the CSI message set that do not contain CSI message size indicators, where $Q_m$ is the number of bits per modulation symbol to be used for the CSI report and $v_{CQI}$ is the number of spatial layers the CSI other than the CSI message size indicator is to be carried on. Alternatively, these resource elements could contain modulation symbols whose corresponding channel and information bits are not defined.

In some embodiments, $Q_{CQI}$ and $Q_{RI}$ are determined as in section 5.2.2.6 of 3GPP TS 36.212, and $Q=N_L^{(x)}$. $(N_{symb}^{PUSCH} \cdot M_{sc}^{PUSCH} \cdot Q_m^{(x)})$, where $N_L^{(x)}$, $M_{sc}^{PUSCH}$, $N_{symb}^{PUSCH}$, and $Q_m^{(x)}$ are determined as in section 5.2.2.6 of TS 36.212, and $Q_{other}=0$. In other embodiments, $Q_{CQI} = \text{ceil}(\beta_{CQI} O_{CQI} / \lfloor Q_m v_{CQI} \rfloor)$, where ceil(x) is the least integer greater than or equal to x. $Q_m$ is the number of bits per modulation symbol to be used for the CSI report. $O_{CQI}$ is the number of information bits to be reported for CSI other than the CSI message size indicator, and may include CQI and/or PMI corresponding to one or more cells CSI processes, and/or eMIMO-Types, $\beta_{CQI}$ is a positive real number that adjusts the code rate. $v_{CQI}$ is the number of spatial layers the CSI other than the CSI message size indicator is to be carried on. In some embodiments, $Q_{RI} = \text{ceil}(\beta_{RI} O_{RI} / Q_m)$, where $Q_m$ is the number of bits per modulation symbol to be used for the CSI report. $O_{RI}$ is the number of information bits to be reported for the CSI message size indicator(s), and may include RI, CRI, and/or RPI corresponding to one or more cells, CSI processes, and/or eMIMO-Types. $\beta_{RI}$ is a positive real number that adjusts the code rate, and RI is mapped to the same resource elements in all layers of the PUSCH.

In some embodiments, CSI retransmission is supported. If a first transmission of a CSI report is not correctly received, a second transmission of the CSI report with the same information bit payload as the first transmission may be requested by the network node 12.

Figure 20:
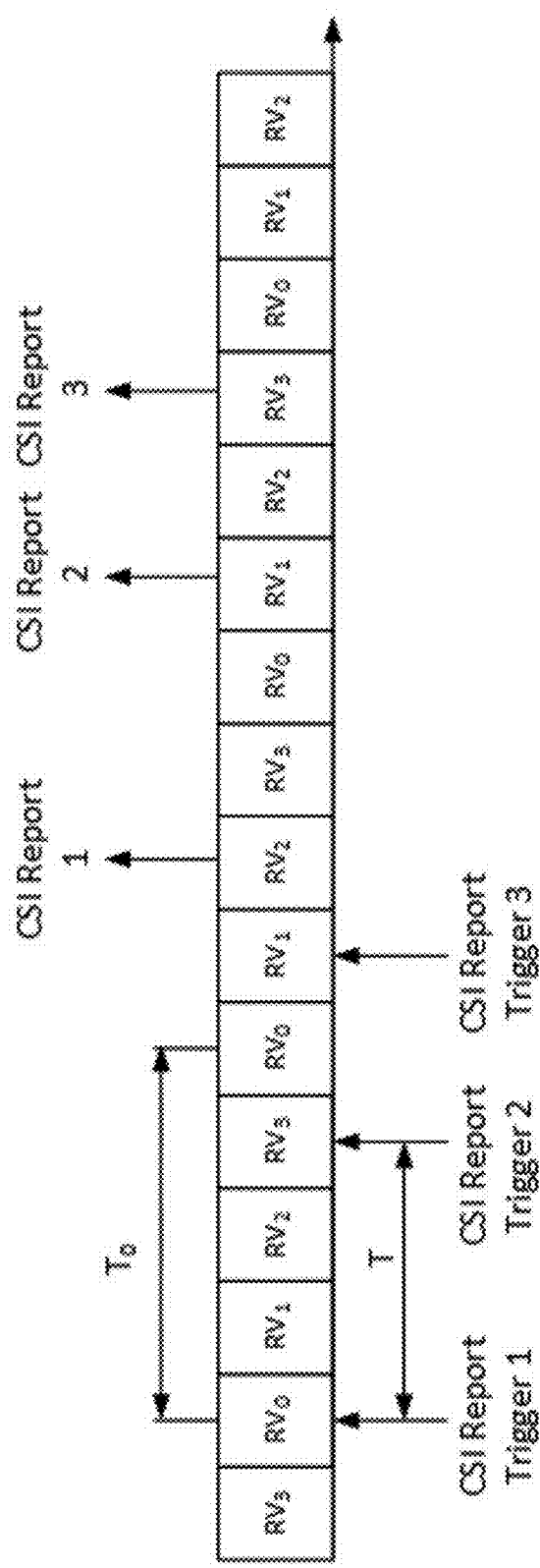
FIG. 20 is a diagram of retransmission of CSI according to the delay after a prior CSI report trigger in accordance with the principles of the disclosure.

In an embodiment, the wireless device 14 may not update the CSI report (that is, change the values of the CSI parameters that are reported) until a predetermined amount of time has elapsed since the time a prior report has been triggered. In this way, the information bit payload of the second transmission of a CSI report can be identical to the first CSI report, and so the network node 12 receiving the CSI report can use HARQ combining on the first and second transmissions. This embodiment is shown in more detail in FIG. 20. In particular, FIG. 20 is a diagram of retransmission of CSI according to the delay after a prior CSI report trigger in accordance with the principles of the disclosure. Here, CSI report triggers one, two, and three are received by wireless device 14, and wireless device 14 transmits three CSI reports, each of which is for corresponding triggers one, two, or three. CSI report trigger two occurs less than a threshold time delay T0 after CSI report trigger one, while CSI trigger three occurs more than the T0 time delay after CSI trigger one. Therefore, the WD does not update the CSI carried in CSI report two, and the same CSI information bits are reported in CSI report two as for CSI report one. On the other hand, the WD does update CSI report three, and so the information bits in CSI report three may be different from those in CSI reports one and two.

In some embodiments, wireless device 14 encodes each CSI report with one of multiple redundancy versions. In this way, the first and second transmissions of a CSI report can use different redundancy versions, allowing better coding gain in the HARQ combining. The redundancy version for a transmission of a CSI report can be determined according to the report timing, such as the time instant in which the report is triggered, the time to which the CSI report corresponds (such as the LTE reference resource subframe), or the time instant in which the CSI report is transmitted. Alternatively or additionally, a request for the second CSI report can include an indication of which redundancy version to use.

FIG. 20 shows an embodiment where the redundancy version is determined according to the time instant in which the CSI report is triggered. The redundancy version number i of the redundancy version $RV_i$ is identified by an index that may be determined as $i=(t+t_0) \mod N_{RV}$, where t is a time index, $t_0$ is a time offset, and $N_{RV}$ is the number of redundancy versions. Since CSI reports 1 and 2 are triggered in subframes associated with $RV_0$ and $RV_1$, respectively, they are encoded using $RV_0$ and $RV_1$, respectively. Then since CSI report 2 is a retransmission of CSI report 1, a receiver can HARQ combine the two reports.

Figure 21:
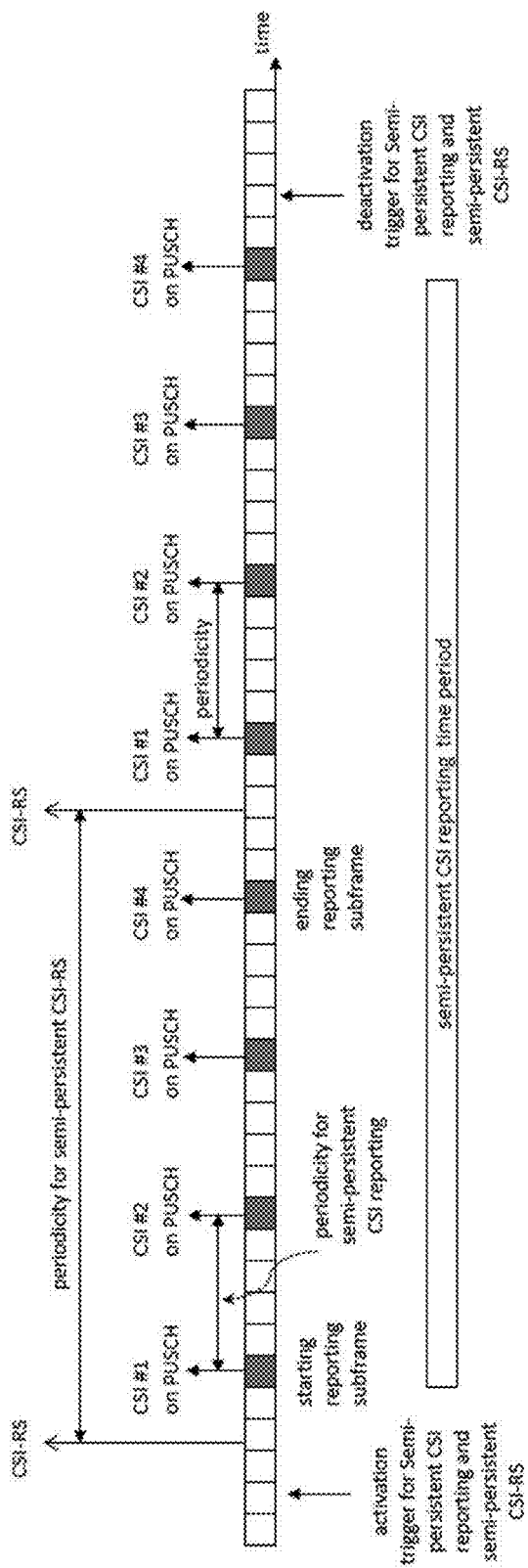
FIG. 21 is a diagram of CSI reporting over multiple instances using semi-persistent CSI reporting with joint activation/deactivation triggering with semi-persistent CSI-RS in accordance with the principles of the disclosure.

In some embodiments, when semi-persistent CSI reporting is jointly triggered for activation/deactivation with semi-persistent CSI-RS, portions of a complete CSI message are reported in multiple CSI reports as shown in FIG. 21. In particular, FIG. 21 is a diagram of CSI reporting over multiple instances using semi-persistent CSI reporting with joint activation/deactivation triggering with semi-persistent CSI-RS in accordance with the principles of the disclosure.

In this embodiment, the number of CSI reports per complete CSI message is fixed and this number is semi-statically configured as part of a CSI report setting. The WD measures the CSI-RS in each CSI-RS transmission instance of the activated semi-persistent CSI-RS, and calculates a complete CSI message once for each such CSI-RS transmission. In this embodiment, the periodicity of the semi-persistent CSI-RS is given by the periodicity of the semi-persistent reporting times the number of CSI reports per complete CSI message. In the example of FIG. 21, the number of CSI reports per complete CSI message is four, and the periodicity of the semi-persistent CSI-RS is four times the periodicity of the semi-persistent reporting.

Some Example Embodiments include:

Embodiment 1A

A method for adaptively transmitting periodically reported CSI on a physical channel in a wireless device, comprising:
a) Receiving a control signaling message configuring the wireless device to transmit CSI on the physical channel, the physical channel being capable of carrying higher layer data, and the message identifying a periodicity;
b) Receiving physical layer control signaling identifying how CSI should be transmitted,
  i) the signaling identifying at least one of a modulation state, a number of spatial layers, and a number of physical channel resources containing at least the CSI report,
c) Transmitting a plurality of CSI reports, the reports being transmitted with the periodicity and according to the physical layer control signaling.

Embodiment 2A

The method of Embodiment 1A, further comprising
a) Transmitting a portion of a CSI message set in a first CSI report, and the remainder of the CSI message set in one or more subsequent CSI reports.
b) Including a CSI message size indicator in each CSI report, wherein
   i) the CSI size indicator identifies the size of the CSI message set, and
   ii) forward error correction coding is applied to CSI information bits not containing the CSI message size indicator

Embodiment 3A

A method of indicating excess CSI message size in a wireless device, the method comprising:
a) Receiving an allocation of physical layer resources in which at least a CSI message set is being conveyed, wherein the number of available resources is less than the number of resources required to carry the CSI message set,
b) Transmitting a CSI message set size indicator according to the allocation of physical layer resources, wherein
   i) the CSI message set size indicator identifies the size of the CSI message set
c) transmitting resources within the physical channel that correspond to the CSI message set, the resources containing one of a portion of the CSI message and undefined content.

Embodiment 4A

The method of Embodiment 3A, wherein the CSI message set size indicator comprises one or more of a rank indication, a CSI-RS resource allocation, and a relative power indication

Embodiment 5A

A method of retransmitting CSI in a wireless device, the method comprising,
a) Transmitting a first CSI report in a first time instant
b) Transmitting a second CSI report in a second time instant that is T time units later than the first time instant, wherein
   i) If T is greater than a threshold $T_0$, the wireless device is expected to update the CSI in the second CSI report, and
   ii) If T is less than a threshold $T_0$, the wireless device reports the same values of CSI in the first and second CSI reports.

Embodiment 6A

The method of Embodiment 5A, further comprising
a) Selecting a first redundancy version according to a first time instant in which the first CSI report is transmitted; and
b) Selecting a second redundancy version according to a second time instant in which the second CSI report is transmitted.

In these embodiments, control signalling identifies at least one characteristic of how CSI should be transmitted. In one or more embodiments, the at least one characteristic is at least one of a modulation state, a number of spatial layers, and a number of physical channel resources containing at least the CSI report, as described herein. It is contemplated that other characteristics can be implemented and that embodiments are not limited solely to those described herein. Error correction encoding the first and second CSI reports with the first and the second redundancy version, respectively.

According to one aspect, a user equipment 14 for transmitting semi-persistent Channel State Information, SP CSI, on a physical uplink shared channel, PUSCH, is provided. The user equipment 14 includes processing circuitry 32 configured to receive a control signaling message for configuring the user equipment 14 with at least one SP CSI report configuration on the PUSCH, the message identifying a SP CSI reporting periodicity; and receive physical layer control signaling for identifying and activating the at least one SP CSI report configuration. The user equipment 14 also includes transmitter circuitry 28 configured to transmit a plurality of SP CSI reports, the reports being transmitted with the SP CSI reporting periodicity and according to the physical layer control signaling and the control signaling message.

According to this aspect, in some embodiments, the processing circuitry 32 is further configured to receive physical layer control signaling to de-activate a previously activated SP CSI report configuration. In some embodiments, the control signaling message is a radio resource control, RRC, message. In some embodiments, the at least one SP CSI report configuration includes at least one SP CSI report setting. In some embodiments, the at least one SP CSI report configuration includes at least one SP CSI resource setting or an association to at least one SP CSI resource setting. In some embodiments, the at least one SP CSI report setting includes at least a CSI feedback type. In some embodiments, the at least one SP CSI report setting includes at least a frequency band over which the SP CSI is to be measured and reported. In some embodiments, the at least one SP CSI report setting further includes a slot offset for each of the at least one SP CSI report configuration. In some embodiments, the at least one SP CSI report configuration further includes a special cell radio network temporary identifier, C-RNTI. In some embodiments, the at least one SP CSI resource setting includes at least one of a resource for channel measurement and a resource for interference measurement. In some embodiments, the physical layer control signaling is a downlink control information, DCI, signaling on a physical downlink control channel, PDCCH. In some embodiments, the physical layer control signaling includes information about resource allocation and modulation for the PUSCH carrying a plurality of SP CSI reports. In some embodiments, the physical control signaling includes a coding rate. In some embodiments, the identifying includes information about the at least one SP CSI report configuration in the downlink control information, DCI.

In some embodiments, the activating is implicitly indicated by a combination of bit fields in the downlink control information, DCI. In some embodiments, the special cell radio network temporary identifier, C-RNTI, is used to scramble a cyclic redundancy check, CRC, bits corresponding to the downlink control information, DCI, wherein, optionally, the special CRNTI is used only to scramble the DCI used for one of activating and deactivating the at least one SP CSI report configuration. In some embodiments, at least one of the activating or deactivating of the at least one SP CSI report configuration is partly indicated by the special cell radio network temporary identifier, C-RNTI, used in scrambling a cyclic redundancy check, CRC, bits corresponding to the downlink control information, DCI, in the physical layer control signaling. In some embodiments, a plurality of SP CSI reports from different user equipments can be multiplexed in the PUSCH. In some embodiments, the multiplexing is spatial multiplexing. In some embodiments, different components of a plurality of SP CSI reports are coded independently. In some embodiments, the processing circuitry 32 is further configured to receive physical layer control signaling for identifying at least one characteristic of measuring and transmitting SP CSI. In some embodiments, the at least one SP CSI report configuration includes an association to at least one SP CSI resource setting.

According to another aspect, a method in a user equipment 14 for transmitting semi-persistent Channel State Information, SP CSI, on a physical uplink shared channel, PUSCH, is provided. The method includes receiving a control signaling message, the control signaling message configuring the user equipment 14 with at least one SP CSI report configuration on the PUSCH, and the message identifying a SP CSI reporting periodicity (S100). The method also includes receiving physical layer control signaling identifying and activating the at least one SP CSI report (S102). The method also includes transmitting a plurality of SP CSI reports, the reports being transmitted with the periodicity and according to the physical layer control signaling and the control signaling message (S104).

In some embodiments, the method further includes receiving physical layer control signaling to de-activate a previously activated SP CSI report configuration. In some embodiments, the control signaling message is a radio resource control, RRC, message. In some embodiments, the at least one SP CSI report configuration include at least one SP CSI report setting. In some embodiments, the at least one SP CSI report configuration includes at least one SP CSI resource settings or an association to at least one SP CSI resource setting. In some embodiments, the at least one SP CSI report setting includes at least a CSI feedback type. In some embodiments, the at least one SP CSI report setting includes at least a frequency band over which the SP CSI is to be measured and reported. In some embodiments, the at least one SP CSI report setting further includes a slot offset for each of the at least one SP CSI report configuration. In some embodiments, the at least one SP CSI report configuration further includes a special cell radio network temporary identifier, C-RNTI. In some embodiments, the at least one SP CSI resource setting includes at least one of a resource for channel measurement and a resource for interference measurement. In some embodiments, the physical layer control signaling is a downlink control information, DCI, signaling on a physical downlink control channel, PDCCH. In some embodiments, the physical layer control signaling includes information about resource allocation and modulation for the PUSCH carrying a plurality of SP CSI reports. In some embodiments, the physical control signaling includes a coding rate. In some embodiments, the identifying includes information about the at least one SP CSI report configuration in the downlink control information, DCI. In some embodiments, at least one of the activating or deactivating is implicitly indicated by a combination of bits corresponding to the downlink control information, DCI. In some embodiments, the special cell radio network temporary identifier, C-RNTI, is used to scramble a cyclic redundancy check, CRC, bits corresponding to the downlink control information, DCI, wherein, optionally, the special C-RNTI is used only to scramble the DCI used for activating or deactivating the at least one SP CSI report configuration. In some embodiments, at least one of the activating or deactivating of the at least one SP CSI report configuration is partly indicated by the special cell radio network temporary identifier, C-RNTI, used in scrambling a cyclic redundancy check, CRC, bits corresponding to the downlink control information, DCI, in the physical layer control signaling. In some embodiments, the plurality of SP CSI reports from different user equipments can be multiplexed in the PUSCH. In some embodiments, the multiplexing is spatial multiplexing. In some embodiments, different components of the plurality of SP CSI reports are coded independently. In some embodiments, the physical layer control signaling identifies at least one characteristic of measuring and transmitting SP CSI.

According to another aspect, a base station 12 for adaptively configuring semi-persistent Channel State Information, SP CSI, on a physical uplink shared channel, PUSCH is provided. The base station includes processing circuitry 20 configured to transmit a control signaling message to configure a user equipment 14 with at least one SP CSI report configuration on the PUSCH, the message identifying a SP CSI reporting periodicity. In some embodiments, transmit physical layer control signaling identifying and activating the at least one SP CSI report configuration; and receiver circuitry 18 configured to receive a plurality of SP CSI reports, the reports being transmitted with the periodicity and according to the physical layer control signaling and the control signaling message.

According to this aspect, in some embodiments, the processing circuitry 20 is further configured to transmit physical layer control signaling to de-activate a previously activated SP CSI report configuration. In some embodiments, the control signaling message is a radio resource control, RRC, message. In some embodiments, the at least one SP CSI report configuration includes at least one SP CSI report setting. In some embodiments, the at least one SP CSI report configuration includes at least one SP CSI resource settings or an association to at least one SP CSI resource setting. In some embodiments, the physical layer control signaling identifies at least one characteristic of measuring and transmitting SP CSI.

According to yet another aspect, a method in a base station 12 for adaptively configuring semi-persistent Channel State Information, SP CSI, on a physical uplink shared channel, PUSCH, is provided. The method includes transmitting a control signaling message to configure a user equipment 14 with at least one SP CSI report configuration on the PUSCH, the message identifying a SP CSI reporting periodicity (S106). The method also includes transmitting physical layer control signaling identifying and activating the at least one SP CSI report (S108). The method also includes receiving a plurality of SP CSI reports, the reports being transmitted with the periodicity and according to the physical layer control signaling and the control signaling message (S110).

According to this aspect, in some embodiments, the method further includes transmitting physical layer control signaling to de-activate a previously activated SP CSI report configuration. In some embodiments, the control signaling message is a radio resource control, RRC, message. In some embodiments, the at least one SP CSI report configuration includes at least one SP CSI report setting. In some embodiments, the at least one SP CSI report configuration includes at least one SP CSI resource settings or an association to at least one SP CSI resource setting. In some embodiments, the physical layer control signaling identifies at least one characteristic of measuring and transmitting SP CSI.

According to yet another aspect, a user equipment 14 for transmitting semi-persistent Channel State Information, SP CSI, on a physical uplink shared channel, PUSCH, is provided. The user equipment 14 includes a receiver module 48 configured to: receive a control signaling message, the control signaling message configuring the user equipment 14 with at least one SP CSI report configuration on the PUSCH, and the message identifying a SP CSI reporting periodicity; and to receive physical layer control signaling identifying and activating the at least one SP CSI report configuration. The user equipment 14 includes a a transmitter module 50 configured to transmit a plurality of SP CSI reports, the reports being transmitted with the periodicity and according to the physical layer control signaling and the control signaling message.

According to this aspect, in some embodiments, the physical layer control signaling identifies at least one characteristic of measuring and transmitting SP CSI. In some embodiments, the SP CSI report configuration includes an association to at least one SP CSI resource setting.

According to another aspect, a base station 12 for adaptively configuring semi-persistent Channel State Information, SP CSI, on a physical uplink shared channel, PUSCH, is provided. The base station 12 includes a transmitter module 44 configured to: transmit a control signaling message to configure a user equipment 14 with at least one SP CSI report configuration on the PUSCH, the message identifying a SP CSI reporting periodicity, and to transmit physical layer control signaling identifying and activating the at least one SP CSI report configuration. A receiver module 42 is configured to receive a plurality of SP CSI reports, the reports being transmitted with the periodicity and according to the physical layer control signaling and the control signaling message.

According to this aspect, in some embodiments, the physical layer control signaling identifies at least one characteristic of measuring and transmitting SP CSI. In some embodiments, the at least one SP CSI report configuration includes an association to at least one SP CSI resource setting.

Some embodiments further include:

Embodiment 1

A wireless device for adaptively transmitting Channel State Information, CSI, on a physical channel, the wireless device comprising:
processing circuitry configured to:
receive a control signaling message, the control signaling message configuring the wireless device to transmit CSI on the physical channel, the physical channel being capable of carrying higher layer data, and the message identifying a periodicity; and
receive physical layer control signaling identifying at least one characteristic of how CSI should be transmitted; and
transmitter circuitry configured to transmit a plurality of CSI reports, the reports being transmitted with the periodicity and according to the physical layer control signaling.

Embodiment 2

The wireless device of Embodiment 1, wherein the transmitter circuitry is further configured to transmit:
a portion of a CSI message set in a first CSI report of the plurality of CSI reports; and
the remainder of the CSI message set in the remaining plurality of reports.

Embodiment 3

A method for a wireless device for adaptively transmitting Channel State Information, CSI, on a physical channel, the method comprising:
receiving a control signaling message, the control signaling message configuring the wireless device to transmit CSI on the physical channel, the physical channel being capable of carrying higher layer data, and the message identifying a periodicity;
receiving physical layer control signaling identifying at least one characteristic of how CSI should be transmitted; and
transmitting a plurality of CSI reports, the reports being transmitted with the periodicity and according to the physical layer control signaling;

Embodiment 4

The method of Embodiment 3, further comprising:
transmitting a portion of a CSI message set in a first CSI report of the plurality of CSI reports; and
transmitting the remainder of the CSI message set in the remaining plurality of reports.

Embodiment 5

A wireless device for indicating excess Channel State Information, CSI, message size, the wireless device comprising:
processing circuitry configured to:
receive an allocation of physical layer resources in which at least one CSI message set is to be conveyed, the number of available resources being less than the number of resources required to carry the at least one CSI message set; and
transmitter circuitry configured to:
transmit a CSI size indicator according to the allocation of physical layer resources; and
transmit resources within the physical channel that correspond to the CSI message set, the resources containing one of a portion of the CSI message and undefined content.

Embodiment 6

The wireless device of Embodiment 5, wherein the CSI size indicator includes at least one of a rank indication, a CSI-RS resource allocation, and relative power indication.

Embodiment 7

A method for a wireless device for indicating excess Channel State Information, CSI, message size, the method comprising:
receiving an allocation of physical layer resources in which at least one CSI message set is to be conveyed, the number of available resources being less than the number of resources required to carry the at least one CSI message set;
transmitting a CSI size indicator according to the allocation of physical layer resources; and transmitting resources within the physical channel that correspond to the CSI message set, the resources containing one of a portion of the CSI message and undefined content.

Embodiment 8

The method of Embodiment 7, wherein the CSI size indicator includes at least one of a rank indication, a CSI-RS resource allocation, and relative power indication.

Embodiment 9

A wireless device for retransmitting Channel State Information, CSI, the wireless device comprising:
transmitter circuitry configured to:
 transmit a first CSI report in a first time instant;
 transmit a second CSI report in a second time instant, the second time instant being T time units later than the first time instant; and
processing circuitry configured to:
 if T is greater than a threshold, update the CSI in the second CSI report; and
 if T is less than the threshold, report the same values of CSI in the first CSI report and second CSI report.

Embodiment 10

A method for a wireless device for retransmitting Channel State Information, CSI, the method comprising:
 transmitting a first CSI report in a first time instant;
 transmitting a second CSI report in a second time instant, the second time instant being T time units later than the first time instant;
 if T is greater than a threshold, updating the CSI in the second CSI report; and
 if T is less than the threshold, reporting the same values of CSI in the first CSI report and second CSI report.

Embodiment 11

A network node for adaptively configuring Channel State Information, CSI, on a physical channel, the network node comprising:
processing circuitry configured to:
 cause transmission of a control signaling message, the control signaling message configuring the wireless device to transmit CSI on the physical channel, the physical channel being capable of carrying higher layer data, and the message identifying a periodicity; and
 cause transmission of a physical layer control signaling identifying at least one characteristic of how CSI should be transmitted; and
receiver circuitry configured to receive a plurality of CSI reports, the reports being received with the periodicity and according to the physical layer control signaling.

Embodiment 12

The network node of Embodiment 11, wherein the receiver circuitry is further configured to:
 receive a portion of a CSI message set in a first CSI report of the plurality of CSI reports; and
 receive the remainder of the CSI message set in the remaining plurality of CSI reports.

Embodiment 13

A method for a network node for adaptively configuring Channel State Information, CSI, on a physical channel, the method comprising:
 causing transmission of a control signaling message, the control signaling message configuring the wireless device to transmit CSI on the physical channel, the physical channel being capable of carrying higher layer data, and the message identifying a periodicity;
 causing transmission of a physical layer control signaling identifying at least one characteristic of how CSI should be transmitted; and
 receiving a plurality of CSI reports, the reports being received with the periodicity and according to the physical layer control signaling;

Embodiment 14

The method of Embodiment 13, further comprising:
 receiving a portion of a CSI message set in a first CSI report of the plurality of CSI reports; and
 receiving the remainder of the CSI message set in the remaining plurality of CSI reports.

Embodiment 15

A network node for indicating excess Channel State Information, CSI, message size, the network node comprising:
transmitter circuitry configured to:
 transmit an allocation of physical layer resources in which at least one CSI message set is to be conveyed, the number of available resources being less than the number of resources required to carry the at least one CSI message set; and
receiver circuitry configured to:
 receive a CSI size indicator according to the allocation of physical layer resources; and
 receive resources within the physical channel that correspond to the CSI message set, the resources containing one of a portion of the CSI message and undefined content.

Embodiment 16

The network node of Embodiment 15, wherein the CSI size indicator includes at least one of a rank indication, a CSI-RS resource allocation, and relative power indication.

Embodiment 17

A method of a network node for indicating excess Channel State Information, CSI, message size, the method comprising:
 transmitting an allocation of physical layer resources in which at least one CSI message set is to be conveyed, the number of available resources being less than the number of resources required to carry the at least one CSI message set;
 receiving a CSI size indicator according to the allocation of physical layer resources; and
 receiving resources within the physical channel that correspond to the CSI message set, the resources containing one of a portion of the CSI message and undefined content.

Embodiment 18

The method of Embodiment 17, wherein the CSI size indicator includes at least one of a rank indication, a CSI-RS resource allocation, and relative power indication.

Embodiment 19

A network node for retransmission of Channel State Information, CSI, the network node comprising:

processing circuitry configured to:
receive a first CSI report in a first time instant;
receive a second CSI report in a second time instant, the second time instant being T time units later than the first time instant;
if T is greater than a threshold, the CSI in the second CSI report has been updated; and
if T is less than the threshold, the same values of CSI in the first CSI report and second CSI have been reported.

Embodiment 20

A method for a network node for retransmission of Channel State Information, CSI, the method comprising:
receiving a first CSI report in a first time instant;
receiving a second CSI report in a second time instant, the second time instant being T time units later than the first time instant;
if T is greater than a threshold, the CSI in the second CSI report being updated; and
if T is less than the threshold, the same values of CSI in the first CSI report and second CSI are reported.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a user equipment for transmitting semi-persistent Channel State Information, SP CSI, on a physical uplink shared channel, PUSCH, the method comprising:
receiving a configuring message, the configuring message configuring the user equipment with at least one SP CSI report configuration on the PUSCH, and the configuring message identifying a SP CSI reporting periodicity;
receiving physical layer control signaling identifying and activating the at least one SP CSI report configuration; and
transmitting a plurality of SP CSI reports, the reports being transmitted with the SP CSI reporting periodicity and according to the physical layer control signaling and the configuring message.

2. The method of claim 1, wherein the at least one SP CSI report configuration includes a slot offset.

3. The method of claim 1, wherein the identifying and activating of the at least one SP CSI report configuration is further based on a semi persistent (SP) radio network temporary identifier.

4. The method of claim 1, further comprising identifying and deactivating the at least one SP CSI report configuration.

5. The method of claim 4, wherein at least one of the activating and deactivating of the at least one SP CSI report configuration is based on combination of bit fields in a downlink control information, DCI.

6. A method in a user equipment, the method comprising:
   identifying a report configuration for semi-persistent Channel State Information, SP CSI, on a physical uplink shared channel, PUSCH; and
   deactivating the report configuration, the deactivating being based on a combination of bit fields in a downlink control information, DCI.

7. A method in a base station for adaptively configuring semi-persistent Channel State Information, SP CSI, on a physical uplink shared channel, PUSCH, the method comprising:
   transmitting a configuring message to configure a user equipment with at least one SP CSI report configuration on the PUSCH, and the configuring message identifying a SP CSI reporting periodicity;
   transmitting physical layer control signaling identifying and activating the at least one SP CSI report configuration; and
   receiving a plurality of SP CSI reports, the reports being transmitted with the periodicity and according to the physical layer control signaling and the configuring message.

8. The method of claim 7, wherein the at least one SP CSI report configuration includes a slot offset.

9. The method of claim 7, wherein the at least one SP CSI report configuration includes at least one selected from a group consisting of:
   at least one SP CSI report setting including a slot offset for each of the at least one SP CSI report configuration; and
   at least one SP CSI report setting including at least one of a resource for channel measurement and a resource for interference measurement.

10. The method of claim 7, wherein the identifying and activating of the at least one SP CSI report configuration is further based on a semi persistent (SP) radio network temporary identifier.

11. The method of claim 7, further comprising causing the identification and deactivation of the at least one SP CSI configuration.

12. The method of claim 11, wherein at least one of the activating and deactivating of the at least one SP CSI report configuration is based a combination of bit fields in downlink control information, DCI.

13. The method of claim 7, wherein different components of a plurality of SP CSI reports are coded independently.

14. The method of claim 7, wherein the physical layer control signaling indicates a slot offset between a slot carrying the physical layer control signaling and a slot on which the at least one SP CSI report is transmitted.

15. A user equipment for transmitting semi-persistent Channel State Information, SP CSI, on a physical uplink shared channel, PUSCH, the user equipment comprising:
   processing circuitry configured to:
      receive a configuring message for configuring the user equipment with at least one SP CSI report configuration on the PUSCH, the configuring message identifying a SP CSI reporting periodicity;
      receive physical layer control signaling for identifying and activating the at least one SP CSI report configuration; and
      transmit a plurality of SP CSI reports, the reports being transmitted with the SP CSI reporting periodicity and according to the physical layer control signaling and the configuring message.

16. The user equipment of claim 15, wherein the at least one SP CSI report configuration includes a slot offset.

17. The user equipment of claim 15, wherein the identifying and activating of the at least one SP CSI report configuration is further based on a semi persistent (SP) radio network temporary identifier.

18. The user equipment of claim 15, further comprising identifying and deactivating the at least one SP CSI report configuration.

19. The user equipment of claim 18, wherein at least one of the activating and deactivation of the at least one SP CSI report configuration is based on combination of bit fields in a downlink control information, DCI.

* * * * *